(12) United States Patent
Bull et al.

(10) Patent No.: US 11,238,393 B2
(45) Date of Patent: Feb. 1, 2022

(54) YIELD MONITORING SYSTEMS AND METHODS

(71) Applicant: Monsanto Technology LLC, St. Louis, MO (US)

(72) Inventors: Jason Bull, St. Louis, MO (US); Govind Chaudhary, St. Louis, MO (US); Kevin Deppermann, St. Louis, MO (US); Brian J. Forinash, St. Louis, MO (US); Randall K. Rader, St. Louis, MO (US); Brad White, St. Louis, MO (US)

(73) Assignee: MONSANTO TECHNOLOGY LLC, St. Louis, MO (US)

(*) Notice: Subject to any disclaimer, the term of this patent is extended or adjusted under 35 U.S.C. 154(b) by 205 days.

(21) Appl. No.: 16/630,251

(22) PCT Filed: Jun. 29, 2018

(86) PCT No.: PCT/US2018/040206
§ 371 (c)(1),
(2) Date: Jan. 10, 2020

(87) PCT Pub. No.: WO2019/013995
PCT Pub. Date: Jan. 17, 2019

(65) Prior Publication Data
US 2020/0394580 A1    Dec. 17, 2020

Related U.S. Application Data

(60) Provisional application No. 62/531,426, filed on Jul. 12, 2017.

(51) Int. Cl.
*G06Q 10/06* (2012.01)
*H04W 4/38* (2018.01)
(Continued)

(52) U.S. Cl.
CPC ..... *G06Q 10/0639* (2013.01); *A01D 41/1271* (2013.01); *G01F 1/86* (2013.01);
(Continued)

(58) Field of Classification Search
CPC .... G06Q 10/0639; G06Q 10/06; G06Q 50/02; G01F 1/86; A01D 41/1271; H04W 4/38
See application file for complete search history.

(56) References Cited

U.S. PATENT DOCUMENTS 5,736,652 A * 4/1998 Strubbe .............. A01D 41/1271
                                                73/861.73
6,508,049 B1   1/2003 Cox et al.
(Continued)

OTHER PUBLICATIONS

International Search Report from corresponding PCT/US2018/040206 dated Sep. 25, 2018.
(Continued)

*Primary Examiner* — Manuel A Rivera Vargas
*Assistant Examiner* — Yaritza H Perez Bermudez
(74) *Attorney, Agent, or Firm* — Sandberg Phoenix & voe Gontard P.C.

(57) ABSTRACT

A system for determining performance data of plants growing in a field. The system comprises a mass flow meter for generating mass data related to the mass of plant product passed through the mass flow meter, and that is communicatively connected to a computer based data processing system; a temperature sensor for determining the temperature of the air adjacent the mass flow meter or within the mass flow meter, and that communicatively connected to the computer based data processing system, and a moisture sensor for determining the moisture of air adjacent the mass flow meter or within the mass flow meter, and that is communicatively connected to the computer based data processing system. The computer based data processing system is structured and operable to utilize the mass data, the
(Continued)

air temperature and the air moisture to determine a yield of the plants from which the plant product was harvested.

20 Claims, 15 Drawing Sheets

(51) Int. Cl.
G06Q 50/02 (2012.01)
H04L 29/08 (2006.01)
A01D 41/127 (2006.01)
G01F 1/86 (2006.01)

(52) U.S. Cl.
CPC ........... G06Q 50/02 (2013.01); H04L 67/125 (2013.01); H04W 4/38 (2018.02)

(56) References Cited

U.S. PATENT DOCUMENTS

| | | | | |
|---|---|---|---|---|
| 9,144,195 | B2* | 9/2015 | Koch | A01D 41/1271 |
| 10,188,037 | B2* | 1/2019 | Bruns | A01D 41/1273 |
| 10,390,484 | B2* | 8/2019 | Baert | A01F 12/46 |
| 10,477,775 | B2* | 11/2019 | Lang | A01F 15/0825 |
| 10,481,105 | B2* | 11/2019 | Advani | G01F 22/00 |
| 2003/0182144 | A1* | 9/2003 | Pickett | A01B 79/005 |
| | | | | 705/317 |
| 2014/0277960 | A1* | 9/2014 | Blank | G05B 13/0275 |
| | | | | 701/50 |
| 2015/0066932 | A1* | 3/2015 | Stuber | G06Q 50/02 |
| | | | | 707/737 |
| 2015/0168187 | A1* | 6/2015 | Myers | G01F 1/80 |
| | | | | 73/861.73 |
| 2016/0084813 | A1* | 3/2016 | Anderson | A01D 41/1271 |
| | | | | 702/5 |
| 2017/0109395 | A1* | 4/2017 | Farah | G06F 16/2358 |
| 2020/0337235 | A1* | 10/2020 | Blank | G01F 1/00 |

OTHER PUBLICATIONS

Written Opinion from corresponding PCT/US2018/040206 dated Sep. 25, 2018.

* cited by examiner

FROM FIG. 11

416 — SIMULTANEOUSLY WITH THE GRAIN BEING DIRECTED THROUGH THE BYPASS DUCT, THE PROCESSING SYSTEM WILL OPEN THE EXIT GATE A SPECIFIC AMOUNT SUCH THAT THE GRAIN WILL FLOW OUT OF THE GRAIN ANALYSIS CHAMBER AT A PREDETERMINED SPEED, RATE, VOLUME, ETC., SUCH THAT THE ASPECT SENSOR(S) (e.g., THE MOISTURE CONTENT SENSOR(S)) CAN ACCURATELY ACQUIRE THE RESPECTIVE ASPECT OF THE GRAIN (e.g., THE MOISTURE CONTENT OF THE GRAIN)

418 — THEREAFTER, AS THE GRAIN FLOWS OUT OF THE GRAIN ANALYSIS CHAMBER, THE ASPECT SENSOR(S) (e.g., THE MOISTURE CONTENT SENSOR(S)) GATHER DATA REGARDING A DESIRED ASPECT OF THE OF THE HARVESTED GRAIN, (e.g., GATHER MOISTURE CONTENT DATA FO THE GRAIN) AND COMMUNICATE THE ASPECT DATA (e.g., THE GRAIN MOISTURE CONTENT DATA) TO THE PROCESSING SYSTEM

420 — THE PROCESSING SYSTEM, VIA EXECUTION OF THE GRAIN ANALYTICS SOFTWARE TAKES THE RAW MASS DATA INPUT THERETO, AND VIA EXECUTION OF THE GRAIN ANALYTICS SOFTWARE UTILIZES THE AIR TEMPERATURE, AND/OR THE AIR MOISTURE CONTENT DATA, AND/OR THE GRAIN ASPECT DATA (e.g., THE GRAIN MOISTURE CONTENT DATA) TO PERFORM MATHEMATICAL OPERATIONS AND COMPUTATIONS ON OR ASSIMILATE WITH THE RAW MASS DATA FROM THE MASS FLOW METER TO ACCURATELY DETERMINE, OR COMPUTE, PLANT YIELD DATA OF THE DISTINCT GROUP OF PLANTS (e.g., PLANT YIELD DATA FOR PLANTS OF PARTICULAR TEST PLOT)

FIG. 11A

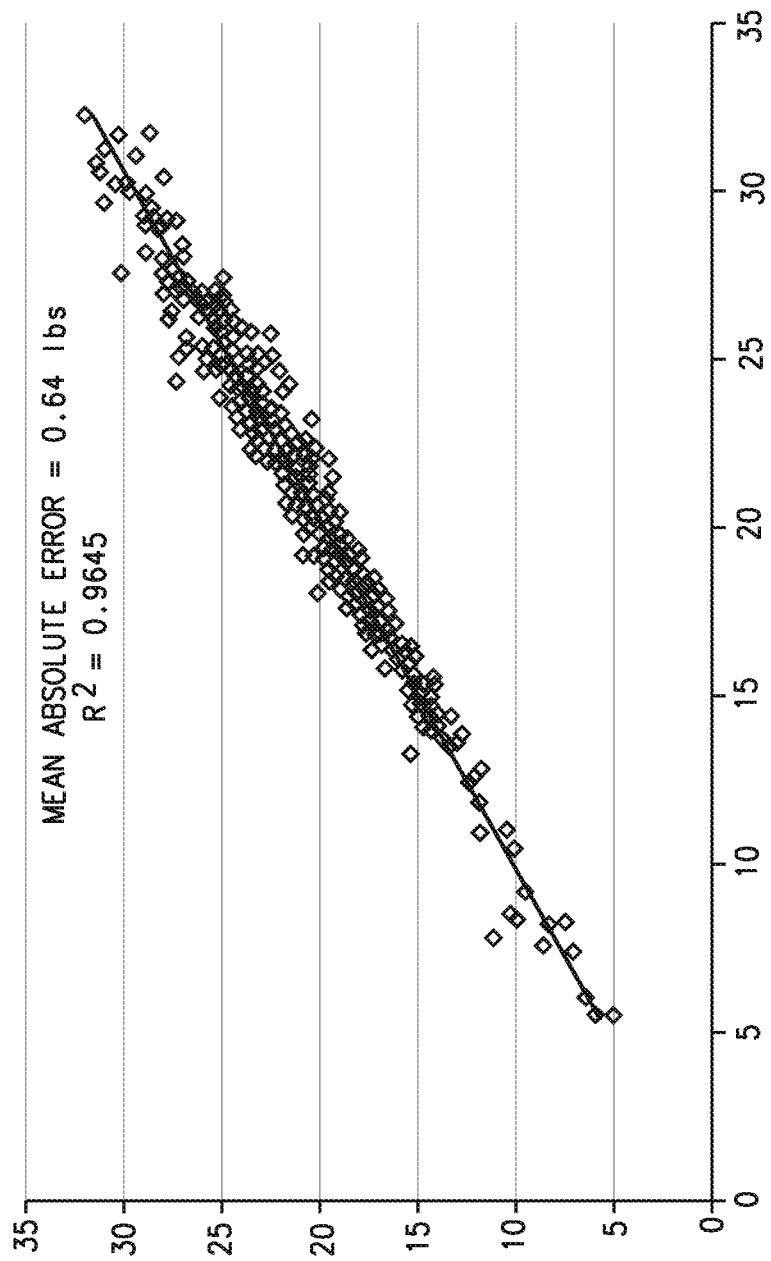

YIELD MONITORING SYSTEMS AND METHODS

CROSS-REFERENCE TO RELATED APPLICATIONS

This application is a National Stage of International Application No. PCT/US2018/040206, filed Jun. 29, 2018, which claims the benefit of U.S. Patent Application No. 62/531,426 filed on Jul. 12, 2017, the disclosures of which are incorporated herein by reference in their entirety.

FIELD

The present teachings relate to systems and methods for accurately determining crop yield values in the field at high throughput rates.

BACKGROUND

The statements in this section merely provide background information related to the present disclosure and may not constitute prior art.

To accurately determine or identify the best performing plants in a breeding program (e.g., to accurately differentiate the yield between hybrids that are closely related, or between like hybrids that are treated with different treatments), the plants are typically tested, at some point, in field conditions, (e.g., tested in the respective test plots). In industrial research settings, seeds growing on plants in discrete test plots are harvested and then the seeds/grains that result are analyzed to determine one or more characteristics related to crop performance. Often, one of the characteristics used by plant breeders to make their selections is yield (i.e. the amount of grain, seed or other plant product produced/collected from a plant or plot).

Large breeding programs often face the challenge of collecting accurate data from millions of individual test plots in a single season, so the reliability of different yield data collection methods must be balanced with the rate of data collection. At least some known high-throughput yield sensing methods and systems include the use of mass flow meters with the capacity to estimate the amount of material flowing past a certain point in a pipe, chute, or other method/type of conduit. However, the quality and accuracy of data generated by such known systems and methods are insufficient for the needs of plant breeders.

SUMMARY

In various embodiments, the present disclosure provides systems and methods for accurately determining performance data about distinct groups of plants growing in a field. For example, in various embodiments, the systems of the present disclosure can be used to sense and, maintain distinct, highly-accurate plant yield data from distinct test plots growing in a field. In various instances, such a system can be implemented in a mobile harvesting platform (e.g., a combine harvester) such that the system determines performance data about distinct groups of plants, in real time, as the mobile platform harvesting the respective grain, seed or other plant product (e.g., a combine harvester) traverses the field (e.g., traverses the test plot(s)).

In various embodiments, such a system can comprise a plant performance data system for determining performance data about groups of plants growing in a field, wherein the system comprises a mass flow meter that is communicatively connected to a computer based data processing system, and is structured and operable to generate mass data related to a mass of grain, seed or other plant product passed through the mass flow meter, and communicate the mass data to the computer based data processing system. In such embodiments, the system can additionally include a temperature sensor that is communicatively connected to the computer based data processing system, and is structured and operable to determine a temperature of the air that is one of adjacent the mass flow meter and within the mass flow meter, and communicate the temperature to the computer based data processing system. Furthermore, in such embodiments, the system can include a moisture sensor communicatively that is connected to the computer based data processing system, and is structured and operable to determine a moisture of air that is one of adjacent the mass flow meter and within the mass flow meter, and communicate the moisture of the air to the computer based data processing system. Still further, in such embodiments, the computer based data processing system is structured and operable to utilize the mass data, the air temperature and the air moisture to determine a yield of the plants from which the grain, seed or other plant product was harvested.

In various embodiments, the preset disclosure provides a plant product performance data collection system for determining performance data about groups of plants, wherein the system comprises: a mass flow meter communicatively connected to a computer based data processing system, and structured and operable to generate mass data related to a mass of plant product passed through the mass flow meter, and communicate the mass data to the computer based data processing system; a temperature sensor communicatively connected to the computer based data processing system, and structured and operable to determine a temperature of the air that is one of adjacent the mass flow meter and within the mass flow meter, and communicate the temperature to the computer based data processing system; and a moisture sensor communicatively connected to the computer based data processing system, and structured and operable to determine a moisture of air that is one of adjacent the mass flow meter and within the mass flow meter, and communicate the moisture of the air to the computer based data processing system, wherein the computer based data processing system is structured and operable to utilize the mass data, the air temperature and the air moisture to determine a yield of the plants from which the plant product was harvested.

In various embodiments the system further comprises at least one plant product aspect sensor communicatively connected to the computer based data processing system, and structured and operable to determine at least one aspect of the plant product passed through the mass flow meter, wherein the computer based data processing system is structured and operable to utilize the mass data, the air temperature, the air moisture, and the at least one plant product aspect to determine a yield of the plants from which the plant product was harvested.

In various embodiments, the at least one aspect sensor comprises at least one moisture sensor structured and operable to determine the moisture of the plant product passed through the mass flow meter.

In various embodiments, the system further comprises a plant product flow sampling and analysis system fluidly connected to the mass flow meter, the plant product flow sampling and analysis system comprising the at least one plant product aspect sensor.

In various embodiments, the plant product flow sampling and analysis system comprises: a tubular housing fluidly connected to the mass flow meter; an analysis chamber disposed internally within the housing and defining a bypass duct within the housing and external to the analysis chamber, the analysis chamber having the plant product aspect sensor disposed therein such that the plant product aspect sensor can determine the at least one aspect of the plant product passed through the mass flow meter; and a diverter system structured and operable, as controlled by the computer based data processing system, to direct the plant product into at least one of the analysis chamber and the bypass duct.

In various embodiments, the analysis chamber comprising an exit gate disposed at an egress end of the analysis chamber and structured and operable to control a flow of plant product exiting the analysis chamber.

In various embodiments, the analysis chamber further comprises at least one of: a chamber empty sensor structured and operable to sense when the analysis chamber is empty of plant product; and a chamber filled sensor structured and operable to sense when the analysis chamber contains a designated amount of plant product.

In various other embodiments, the present disclosure provides a method for determining performance data about groups of plants growing in a field, wherein the method comprises: determining, via a temperature sensor of a plant performance data system, a temperature of air that is one of adjacent a mass flow meter and within the mass flow meter, the plant performance data system comprising the mass flow meter, and communicating the temperature of the air to a computer based data processing system of the plant performance data system; determining, via a moisture sensor of the plant performance data system, a moisture of the air that is one of adjacent the mass flow meter and within the mass flow meter, and communicating the moisture of the air to the computer based data processing system; passing plant product through the mass flow meter and generating mass data related to a mass of the plant product passed through the mass flow meter, and communicating the mass data to the computer based data processing system; and determining a yield of the plants from which the plant product was harvested based on the mass data generated by the mass flow meter, the determined air temperature and the determined air moisture.

In various embodiments, the method further comprises: determining at least one aspect of the plant product passed through the mass flow meter utilizing a plant product aspect sensor of the plant performance data system, and communicating data regarding the at least one plant product aspect to the computer based data processing system; and determining a yield of the plants from which the plant product was harvested based on the mass data generated by the mass flow meter, the determined air temperature, the determined air moisture, and the data regarding the at least one plant product aspect to determine a yield of the plants from which the plant product was harvested.

In various embodiments, the determining at least one aspect of the plant product passed through the mass flow meter further comprises determining the moisture of the plant product passed through the mass flow meter via at least one plant product content moisture sensor disposed within the plant performance data system.

In various embodiments, the determining at least one aspect of the plant product passed through the mass flow meter comprises passing the plant product through a plant product flow sampling and analysis system fluidly connected to the mass flow meter, wherein the plant performance data system comprises the plant product flow sampling and analysis system and the plant product flow sampling and analysis system includes the at least one plant product aspect sensor.

In various embodiments, the passing the plant product through a plant product flow sampling and analysis system to determine the at least one aspect of the plant product passed through the mass flow meter comprises directing the plant product into at least one of an analysis chamber and the bypass duct of the plant product flow sampling and analysis system via a diverter system of the plant product flow sampling and analysis system, the analysis chamber disposed internally within a tubular housing of the plant product flow sampling and analysis system and defining the bypass duct within the housing and external to the analysis chamber, the tubular housing fluidly connected to the mass flow meter, wherein the analysis chamber includes the plant product aspect sensor, whereby the plant product aspect sensor determines the at least one aspect of the plant product passed through the mass flow meter.

In various embodiments, the passing the plant product through a plant product flow sampling and analysis system to determine the at least one aspect of the plant product passed through the mass flow meter further comprises controlling a flow of plant product exiting the analysis chamber via an exit gate disposed at an egress end of the analysis chamber.

In various embodiments, the passing the plant product through a plant product flow sampling and analysis system to determine the at least one aspect of the plant product passed through the mass flow meter further comprises sensing when the analysis chamber is empty of plant product via a chamber empty sensor.

In various embodiments, the passing the plant product through a plant product flow sampling and analysis system to determine the at least one aspect of the plant product passed through the mass flow meter further comprises sensing when the analysis chamber contains a designated amount via a chamber filled sensor.

In various embodiments, the plant performance data system is disposed within a mobile mechanical device structured and operable to harvest plant product from plants as the mobile mechanical device moves through a field in which the plants are growing, and wherein determining the yield of the plants from which the plant product was harvested comprises: passing plant product through the plant performance data system as the plant product is harvested by the plant product harvester as the plant product harvester moves through a field in which the plants from which the plant product is harvested are growing; and determining the yield of the plants from which the plant product was harvested in real time.

In various embodiments, the method further comprises determining the location of alleys that separate plots utilizing the mass data communicated to the computer based data processing system.

In various embodiments, the method further comprises determining the yield of at least one plant growing within a plot utilizing the mass data communicated to the computer based data processing system.

In various other embodiments, the present disclosure provides a mobile mechanical device for harvesting plant product from plants as the mobile mechanical device moves through a field in which the plants are growing, wherein the device comprises: a plant product performance data system structured and operable to determine performance data about groups of the plants, the system comprising: a mass flow meter communicatively connected to a computer based data processing system, and structured and operable to generate mass data related to a mass of plant product passed through the mass flow meter, and communicate the mass data to the computer based data processing system; a temperature sensor communicatively connected to the computer based data processing system, and structured and operable to determine a temperature of the air that is one of adjacent the mass flow meter and within the mass flow meter, and communicate the temperature to the computer based data processing system; and a moisture sensor communicatively connected to the computer based data processing system, and structured and operable to determine a moisture of air that is one of adjacent the mass flow meter and within the mass flow meter, and communicate the moisture of the air to the computer based data processing system, wherein the computer based data processing system is structured and operable to utilize the mass data, the air temperature and the air moisture to determine a yield of the plants from which the plant product was harvested.

In various embodiments, the plant performance data system further comprising a plant product flow sampling and analysis system fluidly connected to the mass flow meter, the plant product flow sampling and analysis system comprising a plant product moisture sensor communicatively connected to the computer based data processing system, and structured and operable to determine a moisture content of the plant product passed through the mass flow meter, wherein the computer based data processing system is structured and operable to utilize the mass data, the air temperature, the air moisture, and the plant product moisture content to determine a yield of the plants from which the plant product was harvested.

In various embodiments, the plant product flow sampling and analysis system comprises: a tubular housing fluidly connected to the mass flow meter; an analysis chamber disposed internally within the housing and defining a bypass duct within the housing and external to the analysis chamber, the analysis chamber having the plant product moisture sensor disposed therein such that the plant product moisture sensor can determine the moisture content of the plant product passed through the mass flow meter, the analysis chamber comprising an exit gate disposed at an egress end of the analysis chamber and structured and operable to control a flow of plant product exiting the analysis chamber; and a diverter system structured and operable, as controlled by the computer based data processing system, to direct the plant product into at least one of the analysis chamber and the bypass duct.

In various embodiments, the analysis chamber further comprises at least one of: a chamber empty sensor structured and operable to sense when the analysis chamber is empty of plant product; and a chamber filled sensor structured and operable to sense when the analysis chamber contains a designated amount of plant product.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIGS. 11 and 11A is a flow chart illustrating the operation of the plant performance data system shown in FIG. 1, in accordance with yet various other embodiments of the present disclosure.

Figure 13:
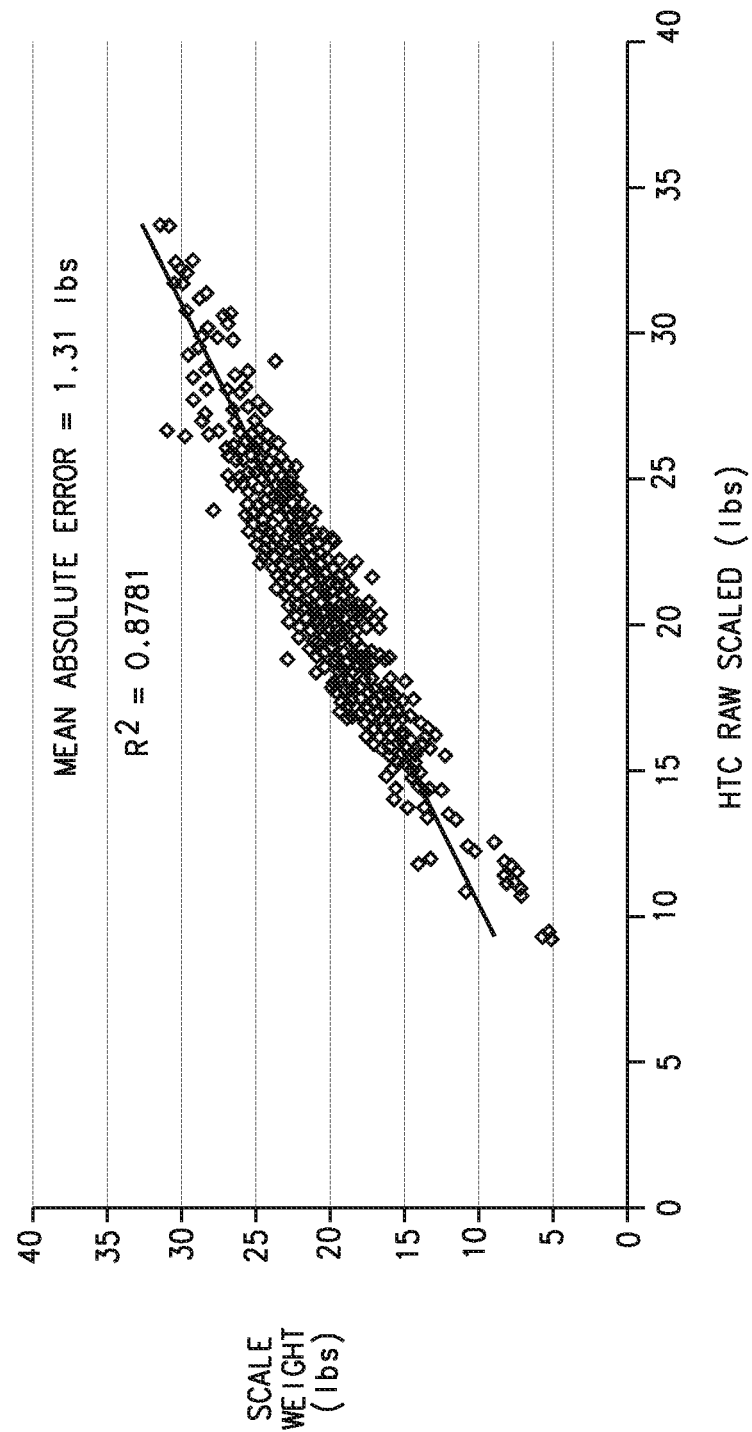
FIG. 13 is a graphical representation of experimental test data illustrating the inaccuracy of only using known systems and protocols to determine plant product yield.
Figure 14:
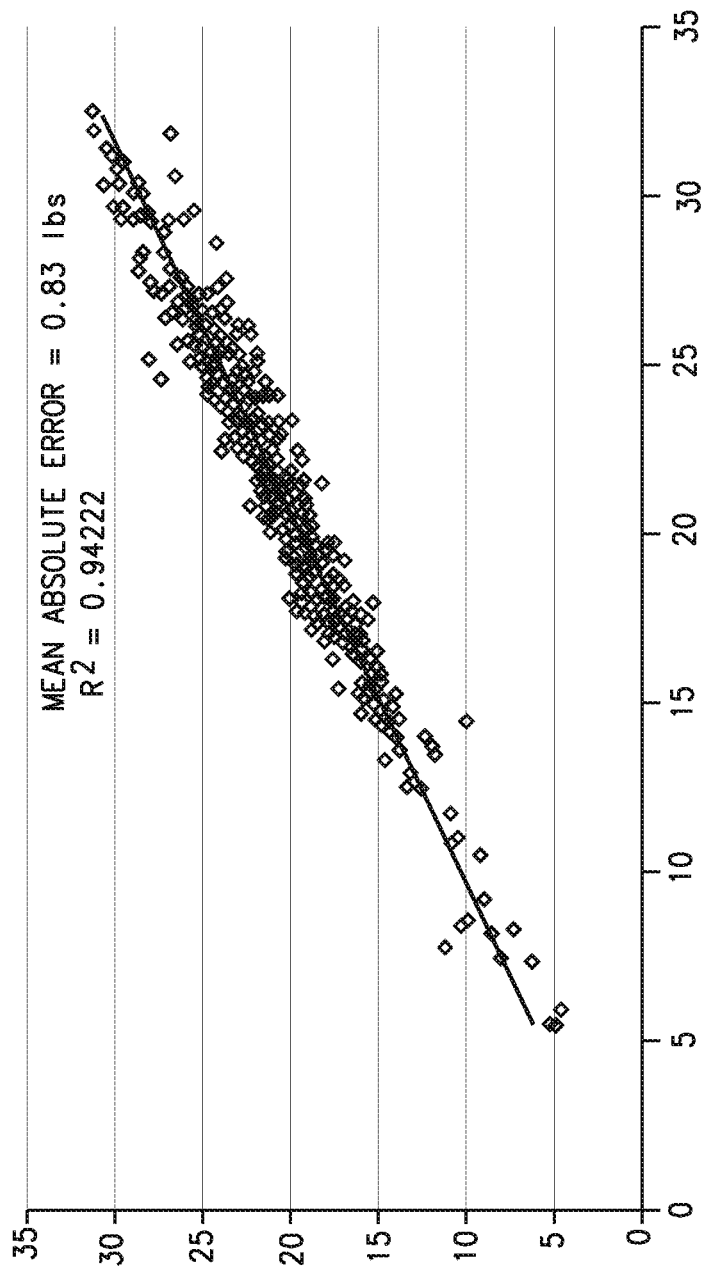

FIG. 14 is a graphical representation of experimental test data illustrating how the plant performance data system, shown in FIGS. 1 through 12, and the methods of using the system as described below, in accordance with various embodiments, significantly increase the accuracy of plant product yield data obtained thereby, when compared to the known system and method described with regard to FIG. 13.

FIG. 15 is a graphical representation of experimental test data illustrating how the plant performance data system, shown in FIGS. 1 through 12, and the methods of using the system as described below, in accordance with various other embodiments, significantly increase the accuracy of plant product yield data obtained thereby, when compared to the known system and method described with regard to FIG. 13.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

The apparatuses/systems and methods described herein can be implemented at least in part by one or more computer program products comprising one or more non-transitory, tangible, computer-readable mediums storing computer programs with instructions that may be performed by one or more processors. The computer programs may include processor executable instructions and/or instructions that may be translated or otherwise interpreted by a processor such that the processor may perform the instructions. The computer programs can also include stored data. Non-limiting examples of the non-transitory, tangible, computer readable medium are nonvolatile memory, magnetic storage, and optical storage. The term code, as used herein, can include software, firmware, and/or microcode, and can refer to one or more programs, routines, functions, classes, and/or objects.

Figure 1:
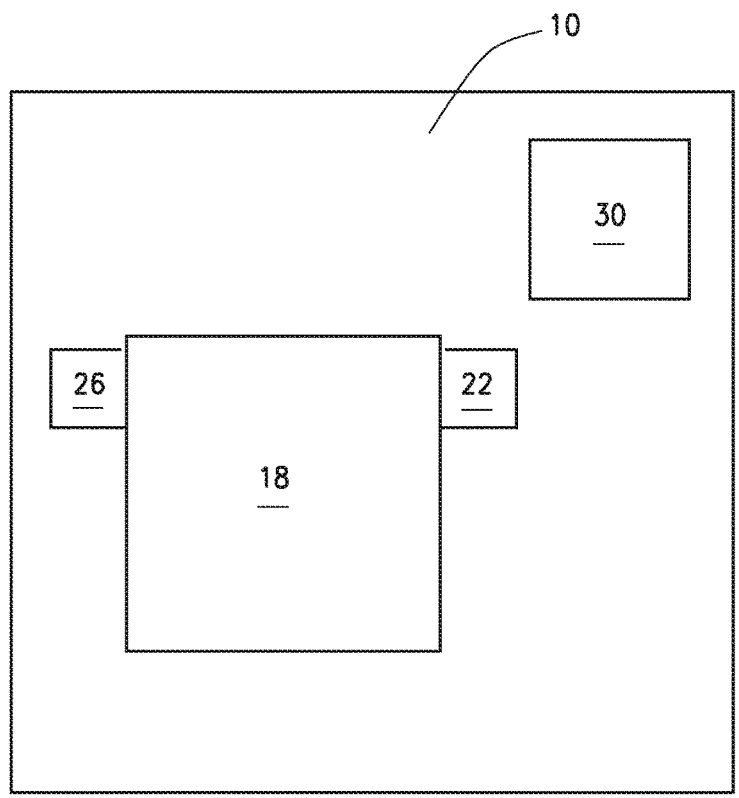
FIG. 1 is a block diagram of a plant performance data system that utilized for determining performance data about groups of plants growing in a field, in accordance with various embodiments of the present disclosure.
Figure 2:
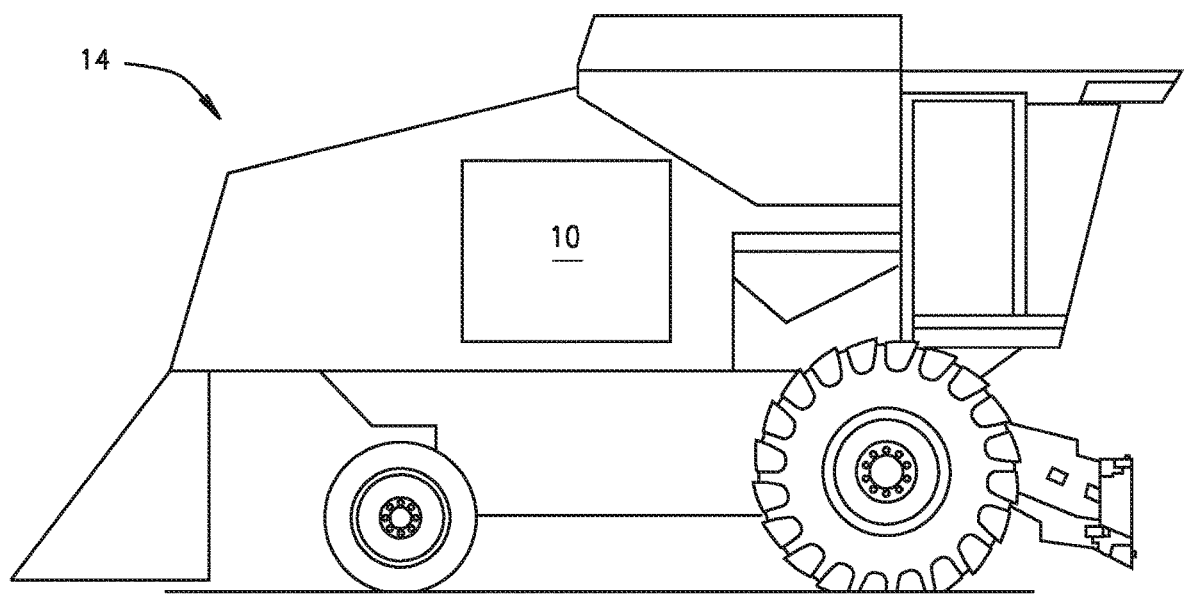
FIG. 2 is a schematic of a mobile harvesting platform including the plant performance data system shown in FIG. 1, in accordance with various embodiments of the present disclosure.

Referring now to FIGS. 1 and 2, in various exemplary embodiments, the present disclosure provides a plant performance data system 10 that is structured and operable to accurately determine performance data about distinct groups of plants (e.g., plants in test plots) growing in a field. For example, in various embodiments, the system 10 can be used to sense and, maintain distinct, highly-accurate yield data from distinct test plots growing in a field. In various instances, as described below, the system 10 can be implemented in a mobile mechanical device 14 structured and operable to harvest grain, seed or other plant product from plants, e.g., a mobile harvesting platform 14 (e.g., a combine harvester), such that the system 10 determines performance data about distinct groups of plants, in real time, as the mobile harvesting platform 14 (e.g., a combine harvester) traverses the field (e.g., traverses the test plot(s)) harvesting the grain from the plants.

It should be noted that systems and methods disclosed herein are not limited to research and development scenarios and/or not limited to testing plants at testing locations and/or at locations where plots are separated by gaps, alleys, etc. In certain embodiments, the systems and methods disclosed herein can be used in commercial settings to determine plant performance on "plots" comprising dozens, hundreds, thousands or more plants of a certain type and/or plants subjected to certain growing conditions. For example, a grower may wish to compare the performance of plants growing in one environment (e.g. a certain soil type) to the performance of plants growing in a different environment (e.g. a different soil type) using this invention. Such cases would not require gaps or alleys in planting to prevent comingling of the values as a pre-defined "management zone" map and an accurate global positioning system (GPS) could be used to accurately associate plants growing in one environment verses another.

As used herein, grain, seed or other plant product exemplarily includes oilseeds cereals and legumes such as wheat, corn, rye, soybeans, oats, rice, millet, canola, and any other seed or plant product collected from a plant, and seeds that still attached to tissues of the mother plant that bore them (e.g., cotton), etc., all of which are generically referred to herein simply as plant product. Additionally, as used herein, a test plot will be understood to mean a single field, or one of a plurality plots within a research field that has been subdivided into a plurality of plots. Each test plot typically comprises one or more rows of plants comprising from about 5 to about 15 or 20 plants (or more) in each row, wherein the plants are subject to various crop breeding and analytics research procedures and tests for developing various strains, hybrids, genotypes, etc. of plants. For example, test plots in a growing area can receive certain treatments (e.g. chemical applications to the plants and/or growing environment), and/or can comprise plants of certain genetics, and/or combinations thereof. Each test plot within a field can be purposely separated from other test plots by a gap, or alleys, where no plants are grown. The gaps or alleys maintain the identity of the plant material within each respective test plot. Hence, there are typically many alleys in a research field, often comprising 10-30 feet of space with no plants.

In various embodiments, the plant performance data system 10 includes at least one mass flow meter 18, at least one ambient air temperature sensor 22, at least one ambient air moisture sensor 26 and a computer based data processing system 30 (simply referred to herein as the processing system 30). The mass flow meter 18 is communicatively connected (i.e., wired or wirelessly) to the processing system 30, and is structured and operable to generate mass data (i.e., raw data) related to the mass, and/or bulk density, of plant product that is passed through a sensing field generated by the mass flow meter 18. The mass flow meter 18 is additionally structured and operable to communicate the mass data to the processing system 30. The mass flow meter 18 can be any suitable mass flow meter (e.g. a capacitance, microwave, etc., mass flow meter), or other device, that generates a sensing field through which the harvested plant product can be passed (e.g. a capacitance, microwave, etc., field). One skilled in the art will easily and readily understand that as the plant product passes through the mass flow meter sensing field, the plant product will disrupt the sensing field, and the amount of disruption is, at least in part, based on the mass, and/or bulk density, of the plant product. Subsequently, the mass flow meter 18 will output to the processing system 30 raw mass data indicative of the amount the sensing field is disrupted by the mass of, and/or bulk density, the plant product as the plant product passes through the sensing field. This raw mass data is communicated by the mass flow meter to the processing system 30. For example, in various embodiments the mass flow meter 18 can comprise, be incorporated with, or be connected to, a cylinder, pipe, duct, chute, or other conduit such that the sensing field is generated across the internal lumen of the cylinder, pipe, duct, chute, or other conduit. The plant product can then be passed through the internal lumen, and consequently passed through the mass flow meter sensing field, whereafter the mass flow meter 18 will communicate the raw mass data (i.e., data indicative of the disruption of the sensing field as the plant product passed through the sensing field) to the processing system 30.

As used herein, the mass flow meter 18 will be referred to, described, and illustrated as the comprehensive unit of the cylinder, pipe, duct, chute, or other conduit through which the plant product is passed, plus the sensing field generation/disruption sensing/communication device that is coupled or integrated with the cylinder, pipe, duct, chute, or other conduit. Additionally, although the mass flow meter 18 is described herein as a device having a cylinder, pipe, duct, chute, or other conduit through which the plant product is passed, the present disclosure is not so limited. That is, it is envisioned that mass flow meter 18 can be any device/meter capable of determining the mass, and/or bulk density, of plant product (or other objects) as the plant product (or other objects) move past or through the respective device/meter.

The ambient air temperature sensor 22 is communicatively connected (i.e., wired or wirelessly) to the processing system 30, and is structured and operable to determine a temperature of the air that is adjacent the mass flow meter 18 (e.g., near an entrance or exit of the mass flow meter 18) and/or within the mass flow meter 18. The ambient air temperature sensor 22 is additionally structured and operable to communicate the temperature (i.e., temperature data) to the processing system 30. One of skill in the art will easily and readily understand when it is reasonable to assume that the temperature of the air near the mass flow meter 18 would approximate the temperature of the air inside the mass flow meter 18 when the mass flow meter 18 is empty. Additionally, the ambient air moisture sensor 26 is communicatively connected (i.e., wired or wirelessly) to the processing system 30, and is structured and operable to determine a moisture content of the air that is adjacent the mass flow meter 18 (e.g., near an entrance or exit of the mass flow meter 18) and/or within the mass flow meter 18. The ambient air moisture sensor 26 is additionally structured and operable to communicate the moisture of the air (i.e., moisture data) to the processing system 30. One skilled in the art will easily and readily understand when it is reasonable to assume that the moisture content of the air near the mass flow meter 18 would approximate the moisture content of the air inside the mass flow meter 18 when the mass flow meter 18 is empty.

The computer based data processing system 30, as described herein, can be any general-purpose computer comprising electronic memory (shared, dedicated or group), e.g., a hard drive, external flash drive, 'Cloud' based storage, or other electronic memory device, and a processor suitable for executing one or more plant product analytics programs, algorithms, routines and/or other code (hereafter referred to simply as the plant product analytics software) that, as described further below, utilizes the received mass data, temperature data and moisture data (and in various other embodiments described below, various other data) to determine a yield of the plants from which the plant product was harvested, and/or any other desired analytic information about the plants and/or plant product. Alternatively, it is envisioned that the computer based data processing system 30 can comprise any other computer based system or device disposable on the mobile platform 14 or remotely from the mobile platform 14 such as a smart phone, hand held computer, tablet or other computer based system/device that comprises memory and a processor capable of executing the plant analytics software. Additionally, it is envisioned that the computer based data processing system 30 can comprise any combination of a general-purpose computer (as described above), any other computer based system or device (as described above), and one or more application specific integrated circuits (ASICs), electronic circuits, combinational logic circuits, field programmable gate arrays (FPGA), or other hardware components that provide various functionality of the system 10, as described herein.

Figure 3:
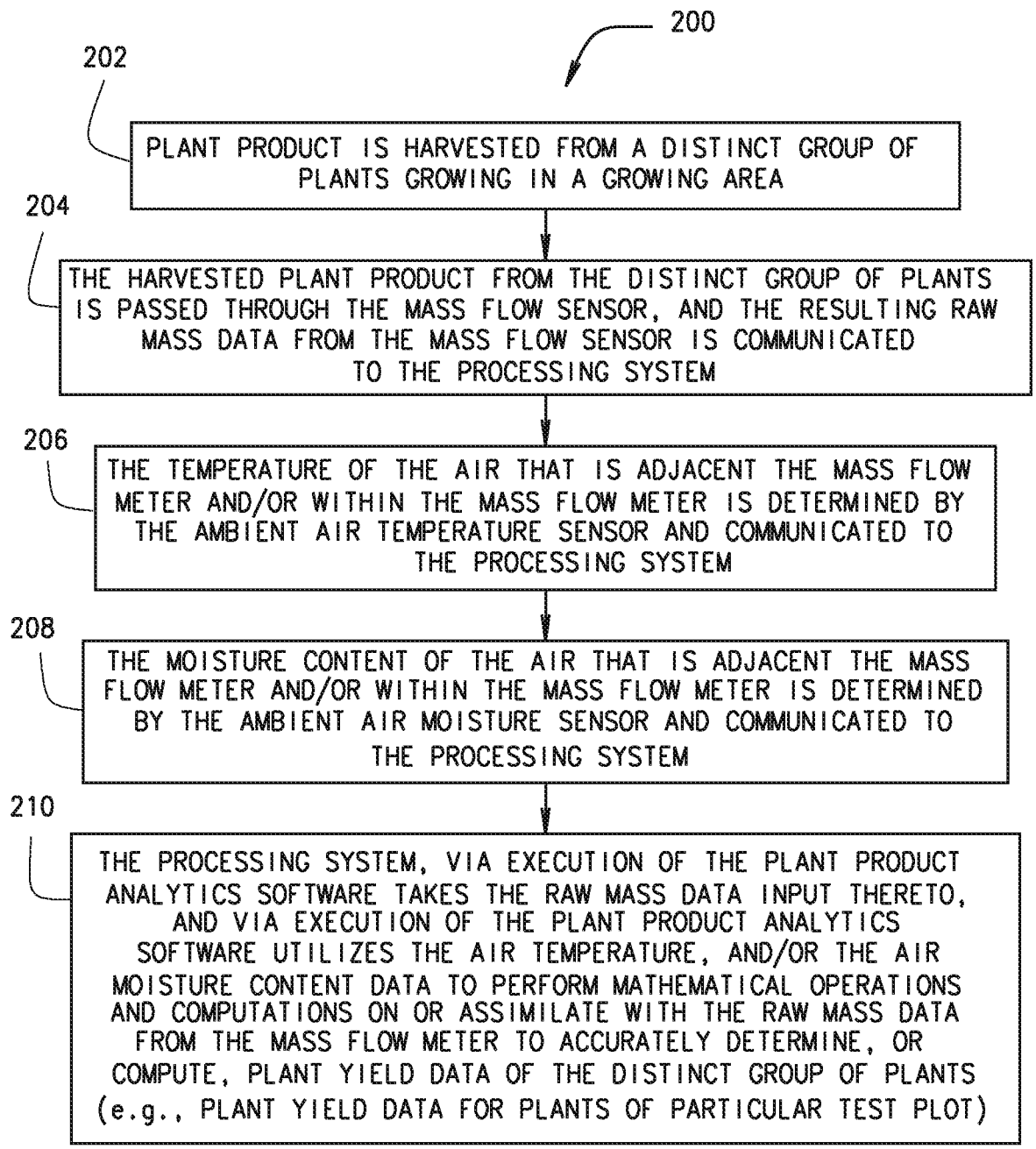
FIG. 3 is a flow chart illustrating the operation of the plant performance data system shown in FIG. 1, in accordance with various embodiments of the present disclosure.

Referring now to FIG. 3, the flow chart 200 exemplarily illustrates operation of the system 10 to determine the yield of the plants from which plant product was harvested, and/or any other desired analytic information about the respective plants and/or plant product, in accordance with various embodiments of the present disclosure. Initially, plant product is harvested from a distinct group of plants growing in a growing area or field, as illustrated at 202. In various instances, the distinct group of plants can be plants growing in one or more test plot and be the subject of crop breeding and analytics research procedures and/or tests for developing various strains, hybrids, genotypes, etc. of plants (e.g., each test plot can comprise different hybrids of plants, groups of plants that have been treated with different types of plant treatments, etc.). Thereafter, the harvested plant product from the distinct group of plants is passed through the mass flow meter 18, and the resulting raw mass data from the mass flow meter 18 is communicated to the processing system 30, as indicated at 204. In the embodiments wherein the system 10 is disposed in the mobile harvesting platform 14, the harvested plant product is manually or automatically fed into (or processed through) the system 10 as the plant product is being harvested and the mobile harvesting platform 14 moves through the field. In other embodiments, the harvested plant product can be collected in sample containers (e.g., the plant product from each test plot collected in a separate sample container) and taken to a different location from where the plant product was harvested (e.g. at the edge of the field, end of the plot/row, or a laboratory) where it can be manually or automatically fed into (or processed through) the system 10.

Either prior to, or after, passing the harvested plant product through the mass flow meter 18, the temperature of the air that is adjacent the mass flow meter 18 (e.g., near an entrance or exit of the mass flow meter 18) and/or within the mass flow meter 18 can be determined by the ambient air temperature sensor 22 and communicated to the processing system 30, as indicated at 206. Additionally, either prior to, or after, passing the harvested plant product through the mass flow meter 18, the moisture content of the air that is adjacent the mass flow meter 18 (e.g., near an entrance or exit of the mass flow meter 18) and/or within the mass flow meter 18 can be determined by the ambient air moisture sensor 26 and communicated to the processing system 30, as indicated at 208. Subsequently, the processing system 30 executes the plant product analytics software, utilizing the raw mass data, and/or the air temperature data and/or the air moisture data communicated to the processing system 30, to determine the yield of the distinct group of plants, as indicated at 210. Particularly, via execution of the plant product analytics software, the processing system 30 takes the raw mass data input thereto, and via execution of the plant product analytics software utilizes the air temperature and/or the moisture content data to perform mathematical operations and computations on, or assimilate, with the raw mass data to determine, or compute, plant yield data of the distinct group of plants (e.g., plant yield data for plants of particular test plot) that is significantly more accurate than plant yield data generated using known systems and methods.

Figure 4:
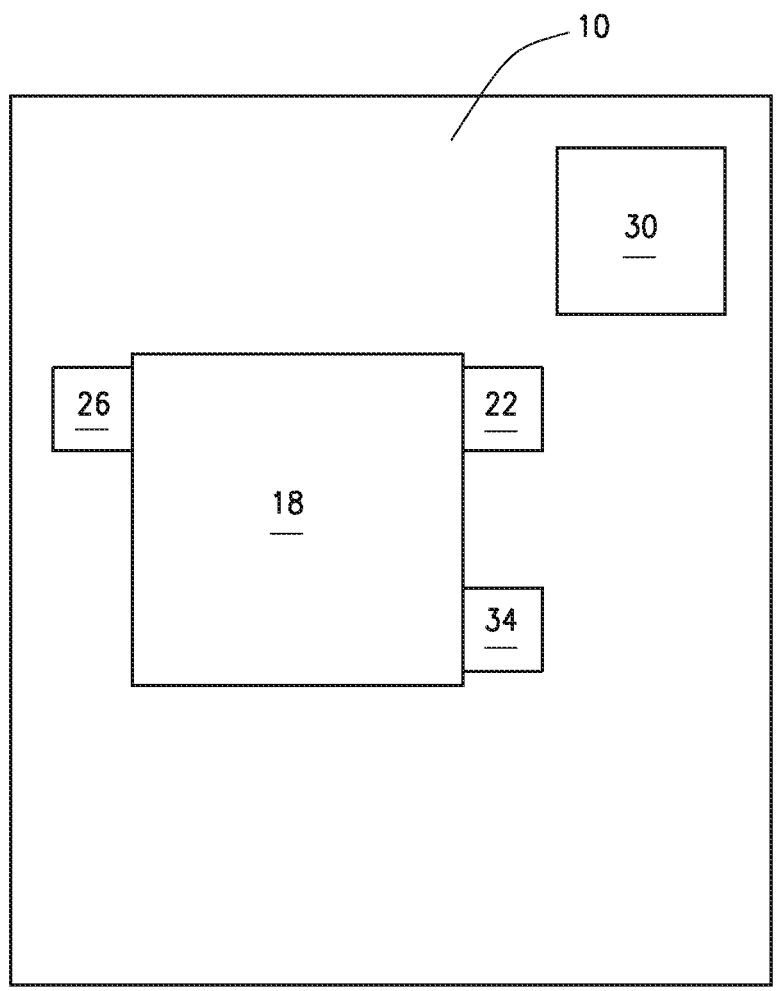
FIG. 4 is a block diagram of the plant performance data system shown in FIG. 1 including a plant aspect sensor, in accordance with various other embodiments of the present disclosure.
Figure 5:
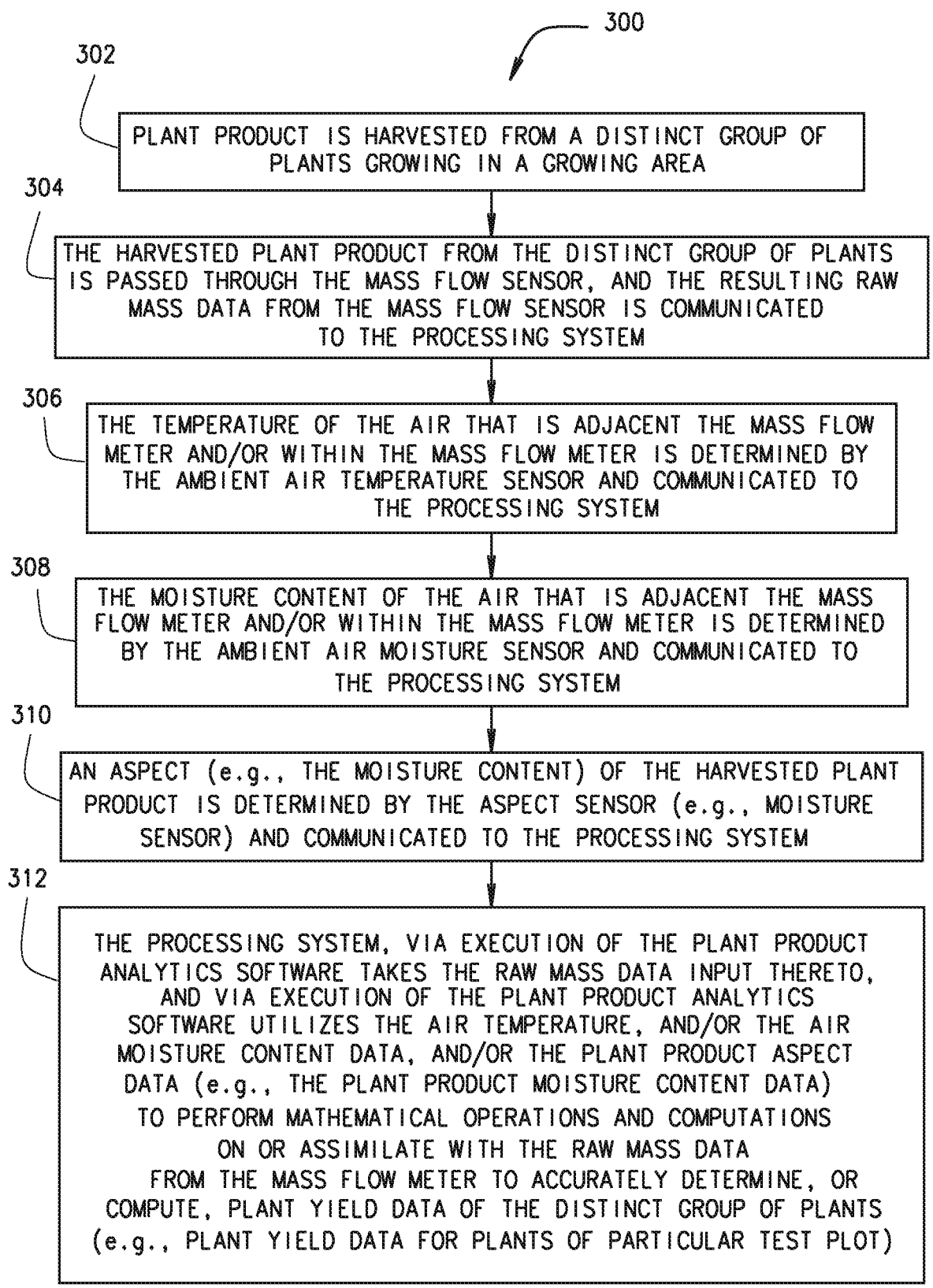
FIG. 5 is a flow chart illustrating the operation of the plant performance data system shown in FIG. 1, in accordance with various other embodiments of the present disclosure.
Figure 6:
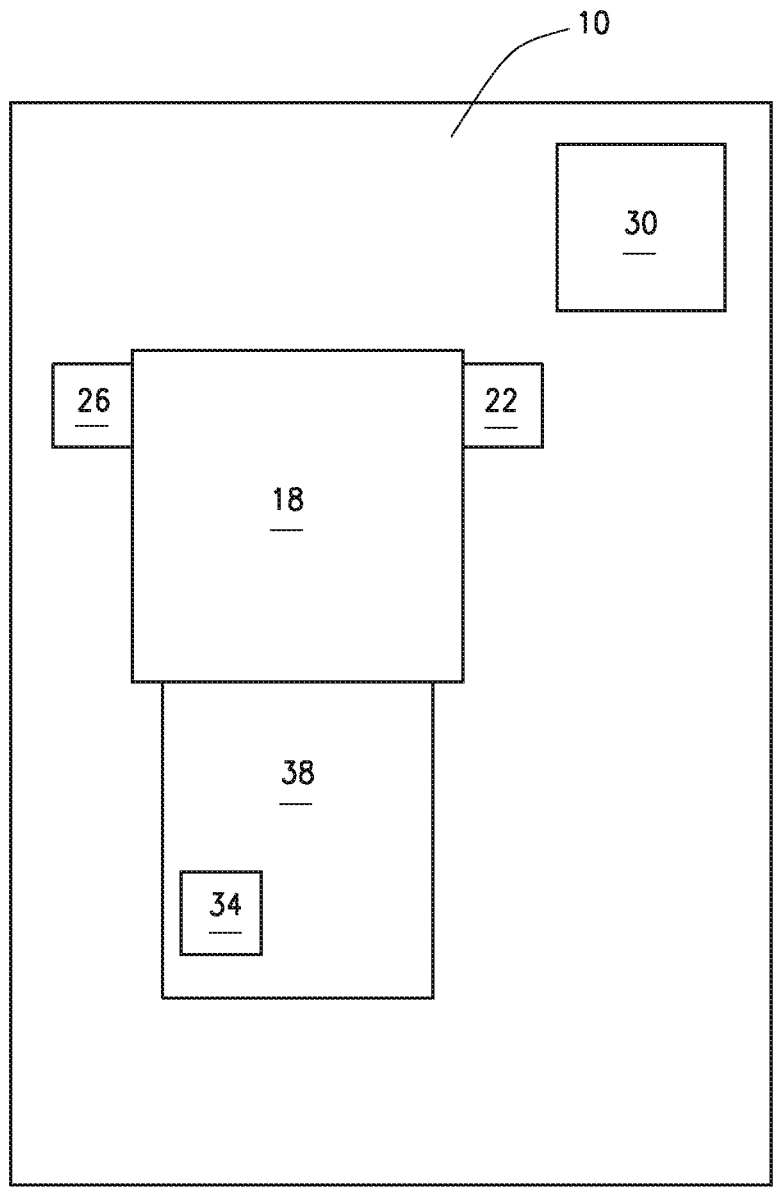
FIG. 6 is a block diagram of the plant performance data system shown in FIG. 1 including a flow sampling and analysis system, in accordance with yet other various embodiments of the present disclosure.

Referring now to FIG. 4, in various embodiments, the system 10 can include one or more plant product aspect sensor or sensing device 34 that is communicatively connected (i.e., wired or wirelessly) to the processing system 30, and is structured and operable to determine one or more additional aspect of the plant product. In such embodiments, the one or more plant product aspect sensor or sensing device 34 can generate data relating to one or more aspect of the harvested plant product and communicate the plant product aspect data to the data processing system 30 such that processing system 30 can utilize raw mass data from the mass flow meter 18 and the aspect data from the plant product aspect sensor or sensing device 34 to determine the plant yield data. In various instances, the processing system 30 can utilize the raw mass data and/or the plant product aspect data, and/or the air temperature data and/or the air moisture data to still more accurately determine the yield of the plants from which the plant product was harvested.

For example, in various embodiments, the one or more plant product aspect sensor or sensing device 34 can comprise a plant product moisture content sensor (referred to herein as the plant product moisture sensor(s) 34) that is structured and operable to determine a moisture content of the harvested plant product prior to, or after, the plant product is passed through the mass flow meter 18. In such embodiments, the data processing system 30 can utilize the raw mass data, and/or the aspect data, and/or the air temperature data, and/or the air moisture data to still more accurately determine the yield of the plants from which the plant product was harvested. In such embodiments, the plant product moisture content sensor 34 can be any moisture sensor (e.g., an NIR moisture sensor) suitable to determine the moisture content of the plant product passed through the mass flow meter 18. It is envisioned that in various embodiments, the mass flow meter 18 can include the aspect sensor(s) 34 (e.g., plant product moisture content sensor(s)), and remain within the scope of the present disclosure. In such instances, wherein the mass flow meter 18 includes the aspect sensor(s) 34 (e.g., plant product moisture content sensor(s)) it is further envisioned that the analysis chamber 46 may or may not include the aspect sensor(s) 34, as described herein.

Although the plant product sensor(s) or sensing device(s) 34 are often referred to and described herein as plant product moisture sensor(s), it should be understood that in various embodiments, the aspect sensor(s) or sensing device(s) can be desired sensor(s) or sensing device(s) for sensing any desired aspect of the harvested plant product. For example, in various embodiments, the aspect sensor(s) or sensing device(s) 34 can be near-infrared (NIR) or other sensor(s) that provides material composition detection, such as starch content detection, disease detection, protein content etc., are any other plant product property desired to be measured. Alternatively, the aspect sensor(s) 34 can be imaging/optical sensor(s)/device(s) for collecting imaging and/or optical data (e.g., image/optical data of any reflected or emitted wavelength), or X-ray sensor(s)/device(s), or nuclear magnetic resonance (NMR) sensor(s)/device(s), computed tomography (CT) sensor(s)/device(s), or electromagnetic sensor(s)/device(s), etc., and remain within the scope of the present disclosure Referring now to FIG. 5, the flow chart 300 exemplarily illustrates operation of the system 10 to determine the yield of the plants from which plant product was harvested, and/or any other desired analytic information about the respective plants and/or plant product, in accordance with various embodiments of the present disclosure wherein the system 10 comprises the plant product aspect/moisture sensor 34. Initially, plant product is harvested from a distinct group of plants growing in a growing area or field, as illustrated at 302. In various instances, the distinct group of plants can be plants growing in one or more test plots and be the subject of crop breeding and analytics research procedures and/or tests for developing various strains, hybrids, genotypes, etc. of plants (e.g., each test plot can comprise different hybrids of plants, groups of plants that have been treated with different types of plant treatments, including chemicals, microbes, etc.). Thereafter, the harvested plant product from the distinct group of plants is passed through the mass flow meter 18, and the resulting raw mass data from the mass flow meter 18 is communicated to the processing system 30, as indicated at 304. In the embodiments wherein the system 10 is disposed in the mobile harvesting platform 14, the harvested plant product is manually or automatically fed into (or processed through) the system 10 as the plant product is being harvested and the mobile harvesting platform 14 moves through the field. In other embodiments, the harvested plant product can be collected in sample containers (e.g., the plant product from each test plot collected in a separate sample container) and taken to a different location from where the plant product was harvested (e.g. at the edge of the field, end of the plot/row, or a laboratory) where it can be manually or automatically fed into (or processed through) the system 10.

Either prior to, or after, passing the harvested plant product through the mass flow meter 18, the temperature of the air that is adjacent the mass flow meter 18 (e.g., near an entrance or exit of the mass flow meter 18) and/or within the mass flow meter 18 is determined by the ambient air temperature sensor 22 and communicated to the processing system 30, as indicated at 306. Additionally, either prior to, or after, passing the harvested plant product through the mass flow meter 18, the moisture content of the air that is adjacent the mass flow meter 18 (e.g., near an entrance or exit of the mass flow meter 18) and/or within the mass flow meter 18 is determined by the ambient air moisture sensor 26 and communicated to the processing system 30, as indicated at 308. Additionally, either prior to passing the harvested plant product through the mass flow meter 18, or after passing the harvested plant product through the mass flow meter 18, or while the harvested plant product is passing through the mass flow meter 18, an aspect (e.g., moisture content) of the harvested plant product is determined by the aspect/moisture sensor 34 and communicated to the processing system 30, as indicated at 310.

Subsequently, the processing system 30 executes the plant product analytics software, utilizing the raw mass data, and/or the air temperature data, and/or the air moisture data, and/or the plant product aspect data (e.g. the plant product moisture content data) communicated to the processing system 30, to determine the yield of the distinct group of plants, as indicated at 312. Particularly, via execution of the plant product analytics software, the processing system 30 takes the raw mass data input thereto, and via execution of the plant product analytics software utilizes the air temperature, and/or the air moisture content data, and/or the plant product aspect data (e.g., the plant product moisture content data) to perform mathematical operations and computations on, or assimilate with, the raw mass data from the mass flow meter 18 to accurately determine, or compute, plant yield data of the distinct group of plants (e.g., plant yield data for plants of particular test plot) that is significantly more accurate than plant yield data generated using known systems and methods.

Referring now to FIGS. 6, 7, 8, 9, 10 and 11, in various instances, in order to accurately determine the desired aspect (e.g., the moisture content) of the harvested plant product, the plant product aspect sensor(s) 34 (e.g., the moisture content sensor(s) 34) may require that the plant product flow or pass by the respective plant product aspect sensor(s) 34 (e.g., moisture content sensor(s) 34) at a certain rate and at a certain density. Additionally, in various implementations of the system 10 (such as those described herein) it may be desirable that such plant product aspect data (e.g., plant product moisture content) be determined (i.e., sensed) at a high throughput rate such that the aspect data (e.g., moisture content) can be determined substantially simultaneously with the plant product passing through the mass flow meter 18 and without interrupting the flow of the plant product through the mass flow meter 18. More particularly, in the embodiments wherein the system is disposed in the mobile harvesting platform 14, it may be desirable that multiple groups of plant product sequentially harvested from multiple groups of plants (e.g., sequentially harvested from multiple test plots) be processed through the mobile harvesting platform 14 and the system 10, and have the plant product aspect data (e.g., the moisture content data) determined thereby at a high throughput rate without ceasing movement of the mobile harvesting platform 14 through the field, without ceasing the harvesting of the plant product, and without commingling of the plant product from the various different groups of plants (e.g., from various different test plots).

Therefore, in various embodiments, the system 10 can further include a flow sampling and analysis system (FSAS) 38 disposed adjacent or connected to (e.g., immediately adjacent or connected to) an entrance end 18A, or adjacent or connected to (e.g., immediately adjacent or connected to) the exit end 18B of the mass flow meter 18. For clarity and simplicity the FSAS 38 will be described and illustrated herein to be connected to the exit end 18B of the mass flow meter 18, however, the features and functionality of the FSAS 38 described herein are equally applicable if the FSAS were disposed immediately adjacent or connected the entrance end 18A of the mass flow meter 18. Hence, in various embodiments, the FSAS 38 is connected in-line with the mass flow meter 18 (e.g., connected to an exit end of the mass flow meter 18) such that plant product deposited in, or directed into, the entrance end 18A of the mass flow meter 18 will flow through the mass flow meter 18 (e.g., by the force of gravity, by a forced air system, etc.) and then flow directly into and through the FSAS 38.

The FSAS 38 includes a tubular housing 42 that is generally in the form of duct that is fluidly connected to the mass flow meter 18 such that plant product will flow through the FSAS housing 42 (e.g., via the force of gravity) prior to or after the plant product has passed through the mass flow meter 18, as described further below. Although it is envisioned that the FSAS 38 can be fluidly connected to the mass flow meter 18 such that the plant product flows through the FSAS 38 before or after passing through the mass flow meter 18, for clarity and simplicity, the FSAS 38 will be described herein as being fluidly connected to the mass flow meter 18 such that the plant product will flow through the mass flow meter 18 prior to entering the FSAS 38, as exemplarily shown in FIGS. 6 and 8.

The FSAS 38 additionally comprises a plant product analysis chamber 46 disposed internally within the housing 42, thereby defining a plant product bypass duct 50 within the housing 42 and external to the plant product analysis chamber 46. The plant product analysis chamber is structured to have a known internal volume and includes and ingress end/opening 46A through which plant product will enter the plant product analysis chamber 46 (as described below) and an egress end/opening 46B through which plant product will exit the plant product analysis chamber 46 (as described below). In various instances, the plant product analysis chamber 46 has the plant product aspect sensor(s) 34 (e.g., plant product moisture content sensors 34) disposed therein such that the plant product aspect sensor(s) can determine at least one aspect of the plant product (e.g., the moisture content of the plant product) as the plant product passes, or flows, through the FSAS 38 after passing through the mass flow meter 18, as described further below. In various embodiments, the one or more plant product aspect sensor comprises one or more plant product moisture content sensor 34 (e.g., a microwave moisture sensor and/or a capacitance moisture sensor). The FSAS 38 further includes a diverter system comprising one or more diverter gates 54 that are structured and operable, as controlled by the processing system 30, to controllably direct the plant product into the bypass duct 50, into the analysis chamber 46, or simultaneously into both the analysis chamber 46 and the bypass duct 50 after the plant product has passed through the mass flow meter 18 and as the plant product is flowing through the FSAS 38. The movement of the diverter gate(s) 54 is implemented by one or more actuator 58 and linkage apparatus 62, operation of the actuator(s) 58 being controlled by the processing system 30.

Generally, the analysis chamber 46 is structured and operable to accumulate a predetermined amount of plant product (e.g., predetermined weight, mass, volume, number of seeds, etc., of plant product) so that aspect sensor(s) 34 (e.g., the plant product moisture content sensor(s) 34) can accurately analyze the plant product and accurately generate the respective plant product aspect data (e.g., plant product moisture content data), and communicate the respective plant product aspect data (e.g., plant product moisture content data) to the processing system 30. Importantly, the FSAS 38 is structured and operable to determine the desired plant product aspect (e.g., the plant product moisture content) as the plant product flows through the system 10 (particularly through the mass flow meter 18) a high throughput rate without ceasing the flow of the plant product through the system 10. For example, in the embodiments wherein the system is disposed in the mobile harvesting platform 14, the FSAS is structured and operable to allow multiple groups of plant product to be sequentially harvested from multiple groups of plants (e.g., sequentially harvested from multiple test plots), sequentially processed through the mobile harvesting platform 14 and the system 10, and have the plant product aspect data (e.g., the moisture content data) determined without ceasing movement of the mobile harvesting platform 14 through the field, without ceasing the harvesting of the plant product, without ceasing the flow of plant product through the system 10, and without commingling of the plant product from the various different groups of plants (e.g., from various different test plots) after the plant product has passed through the system 10.

Figure 7:
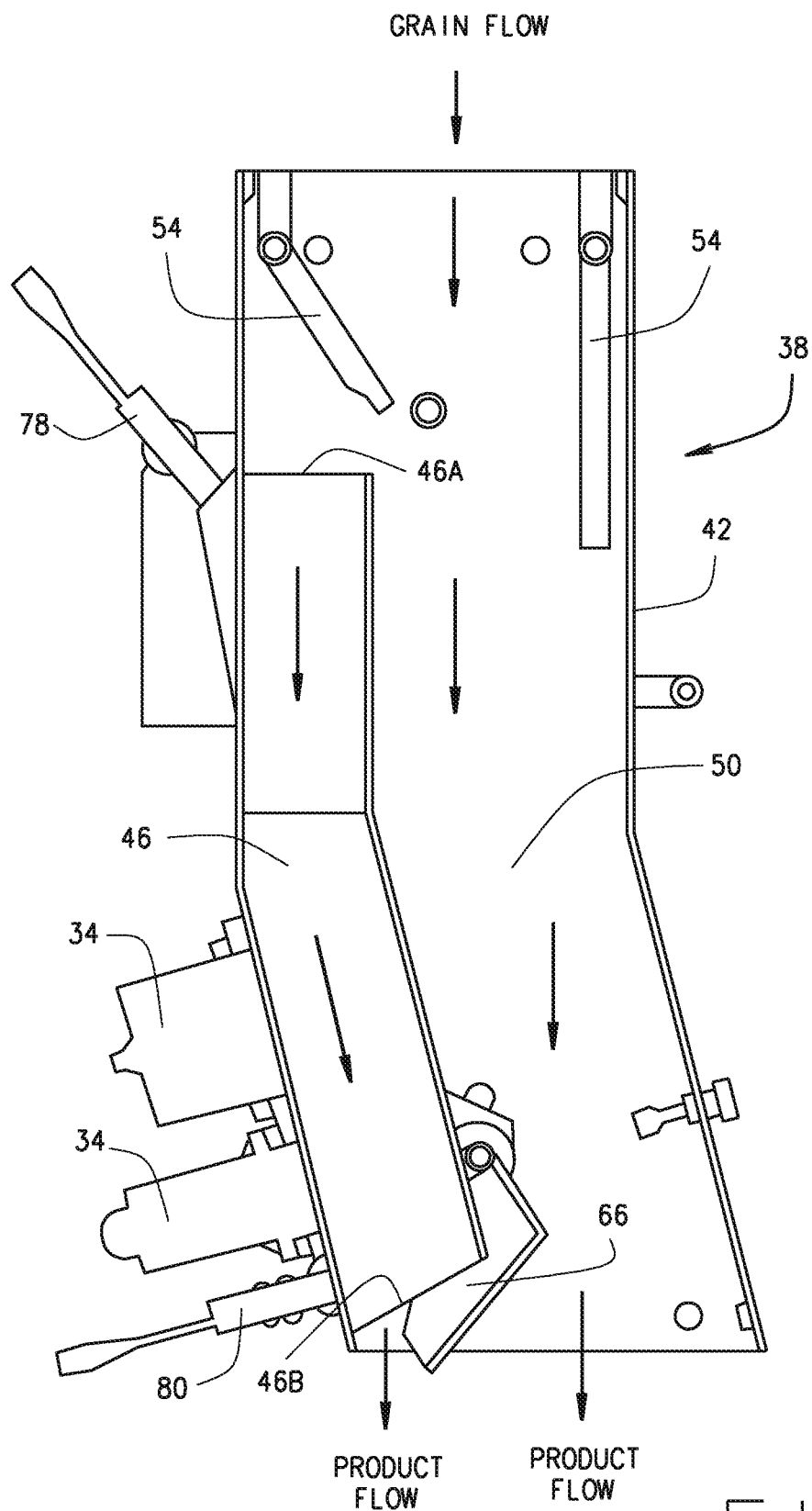
FIG. 7 is a longitudinal cross section of the flow sampling and analysis system having a pair of diverter gates shown in a bypass position and a plant product analysis chamber exit gate shown in a partially opened position, in accordance with various embodiments of the present disclosure.
Figure 8:
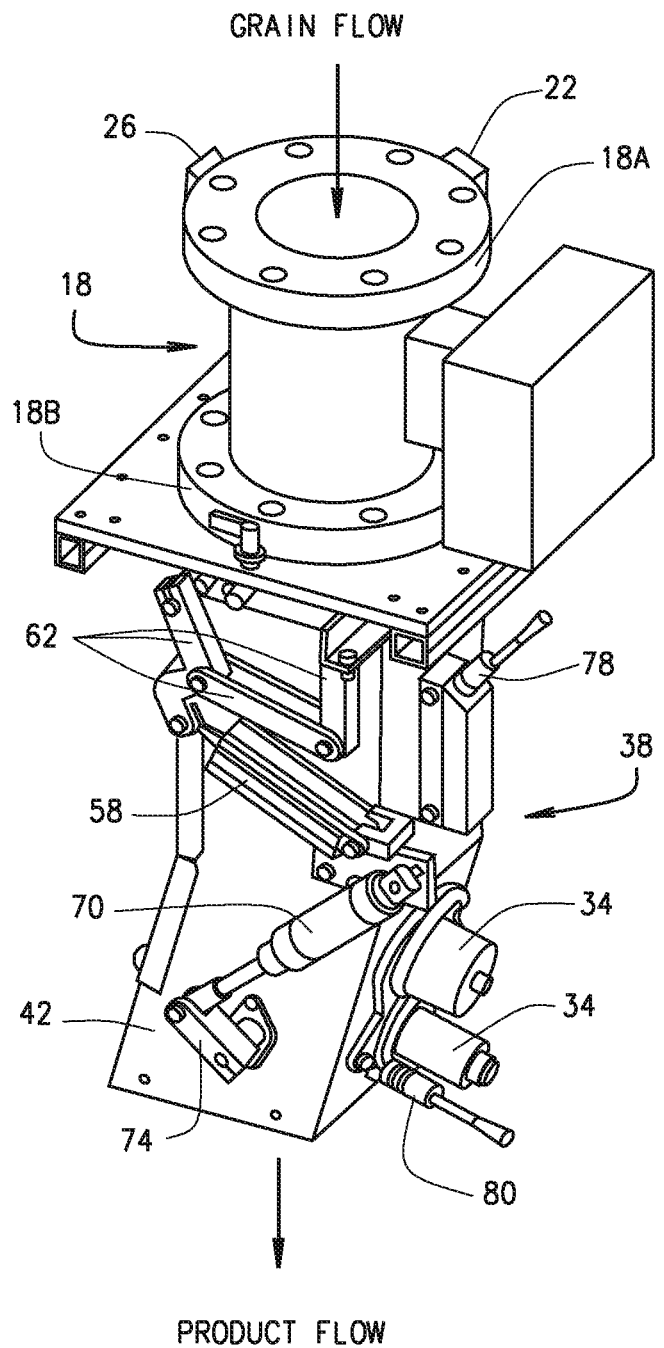
FIG. 8 is an isometric view of the flow sampling and analysis system connected to an exit end of the mass flow meter, in accordance with various embodiments of the present disclosure.
Figure 9:
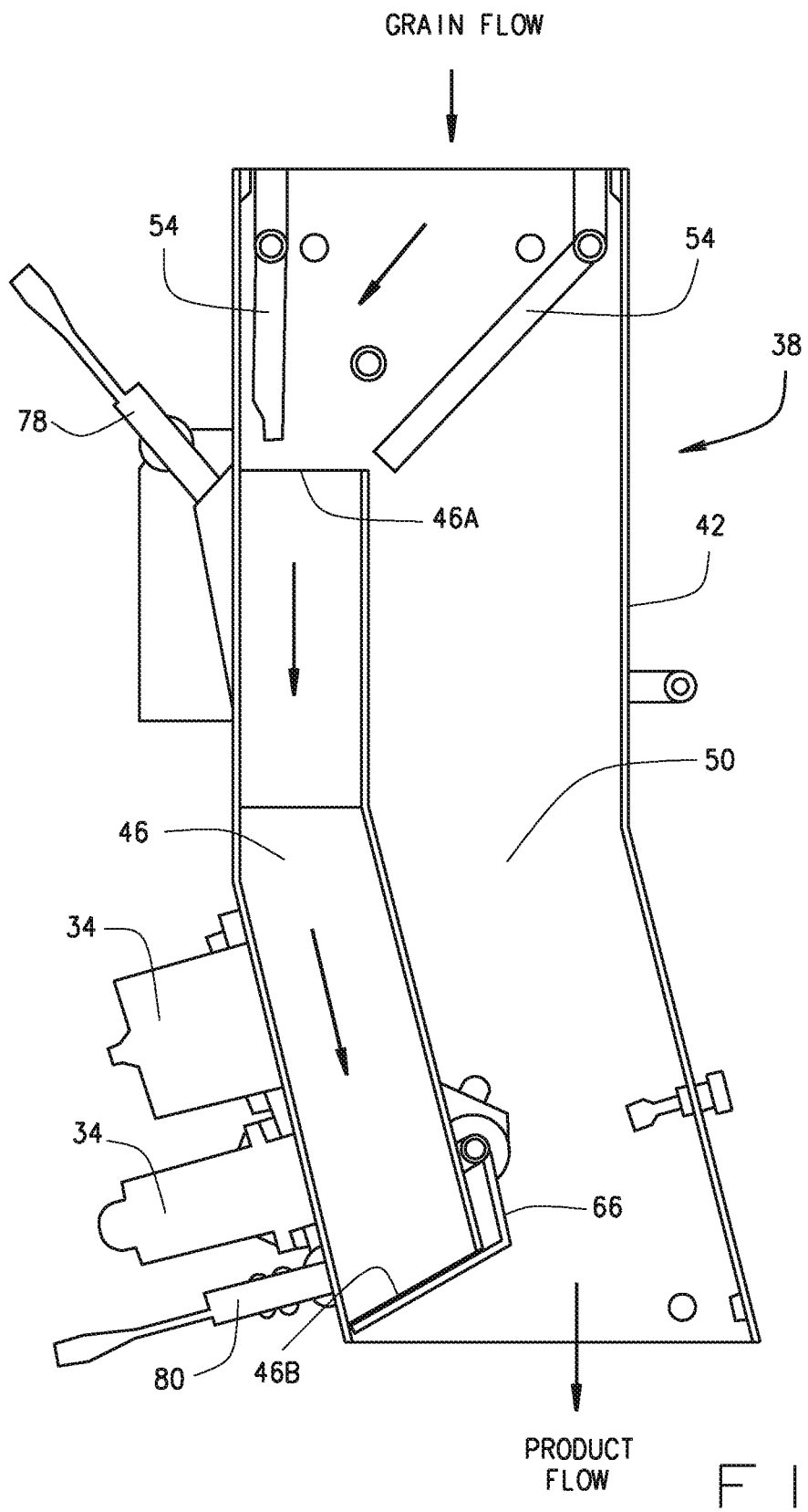
FIG. 9 is a longitudinal cross section of the flow sampling and analysis system having the diverter gates shown in a chamber fill position and the plant product analysis chamber exit gate shown in a closed position, in accordance with various embodiments of the present disclosure.
Figure 10:
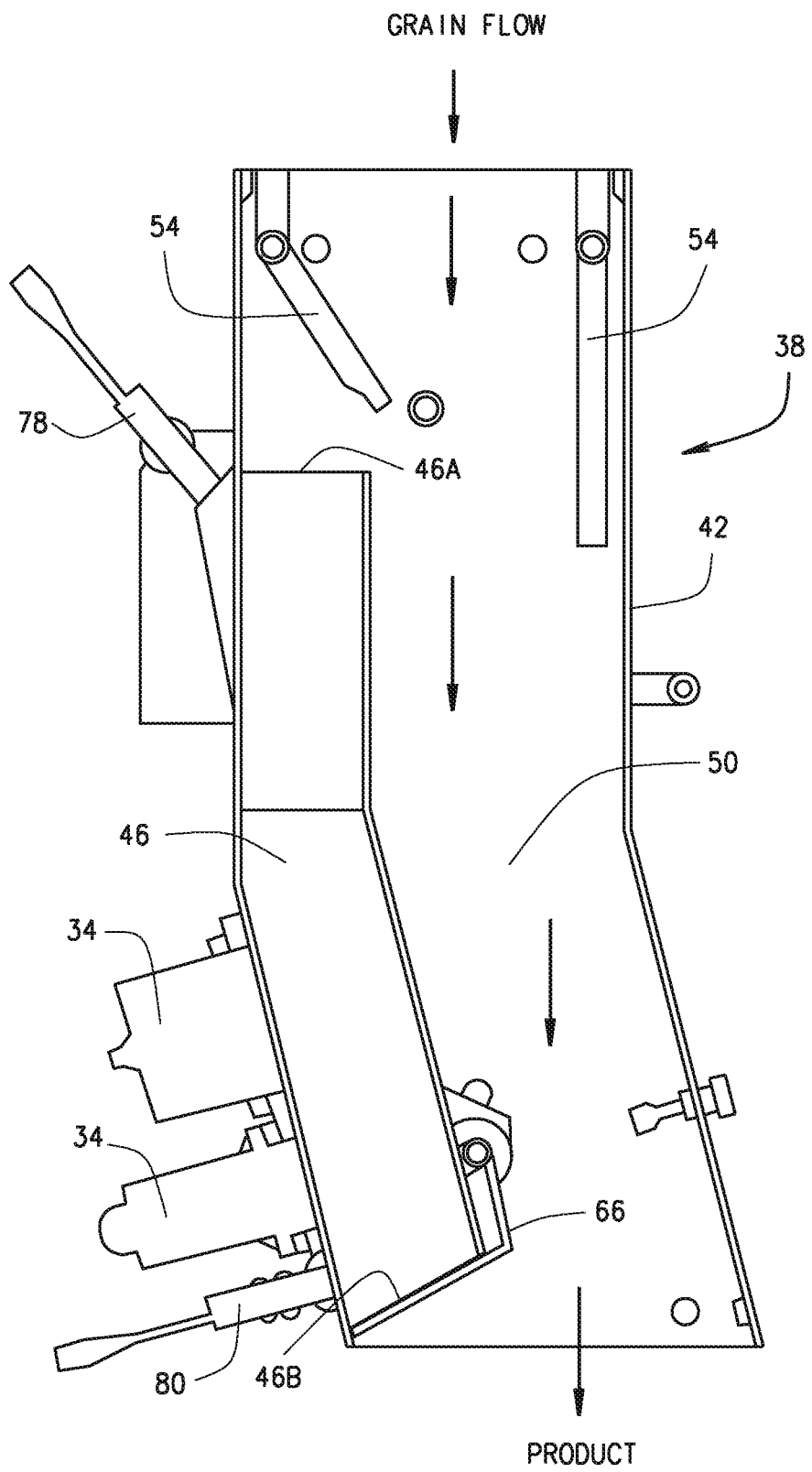
FIG. 10 is a longitudinal cross section of the flow sampling and analysis system having the diverter gates shown in the bypass position and the plant product analysis chamber exit gate shown in a closed position, in accordance with various embodiments of the present disclosure.

In various embodiments, the FSAS 38 further includes one or more flow control gate 66 that is/are pivotally connected to egress end 46B of the plant product analysis chamber 46. The flow control gate(s) 66 is/are pivotal, as controlled by the processing system 30, between an open position a closed position in order to control the flow of plant product through the plant product analysis chamber 46 (e.g., control the flow of plant product exiting the plant product analysis chamber 46). FIG. 7 shows a flow control gate 66 in a partially open position, and FIGS. 9 and 10 show the flow control gate 66 in a closed position. Particularly, the exit gate(s) 66 control(s) the size of an aperture created at the egress end 46B of the plant product analysis chamber 46 as the exit gate(s) controllable move(s) to any position between a fully open position and a fully closed position. More particularly, the controlled positioning of exit gate(s) 66 to any position between fully open and a fully closed will control the speed and volume of the flow of plant product flowing out of the plant product analysis chamber 46. Still more particularly, precisely controlling (via the processing system 30) the positioning of exit gate(s) 66 to any position between fully open and a fully closed will precisely control the speed and volume of the plant product flowing and across, next to, or in front of the aspect sensor(s) 34 (e.g., the moisture content sensors 34), thereby allowing the aspect sensor(s) 34 (e.g., the moisture content sensors 34) to accurately determine the desired aspect of the plant product harvested from a particular group of plants (e.g., determine the moisture content of the plant product harvested from a particular group of plants. The movement of the exit gate(s) 66 is implemented by one or more actuator 70 and linkage apparatus 74, operation of the actuator(s) 70 being controlled by the processing system 30.

Although it has been described above that, in various embodiments, the FSAS 38 can be disposed immediately adjacent or connected to an entrance end 18A, or immediately adjacent or connected to the exit end 18B of the mass flow meter 18, it is envisioned that in various other embodiments, the FSAS 38 can be fluidly connected to the entrance end 18A, or to the exit end 18B, of the mass flow meter 18, wherein via one or more conduits, ducts, other conveyance device or any interstitial device or mechanism, and remain within the scope of the present disclosure. It is further envisioned that in various embodiments, wherein the FSAS 38 is disposed adjacent or connected to (e.g., immediately adjacent or fluidly connected to) an entrance end 18A, the system 10 can further includes a secondary mass flow meter (not shown) that disposed adjacent (e.g., immediately adjacent or fluidly connected to) the analysis chamber egress end 46B. In such embodiments, if a known volume of plant product is capture within the analysis chamber 46 and then the mass of the known volume of plant product captured in the analysis chamber 46 measured, via the secondary mass flow meter, the bulk density (e.g., lbs/bu) of the captured plant product can be calculated.

Figure 11:
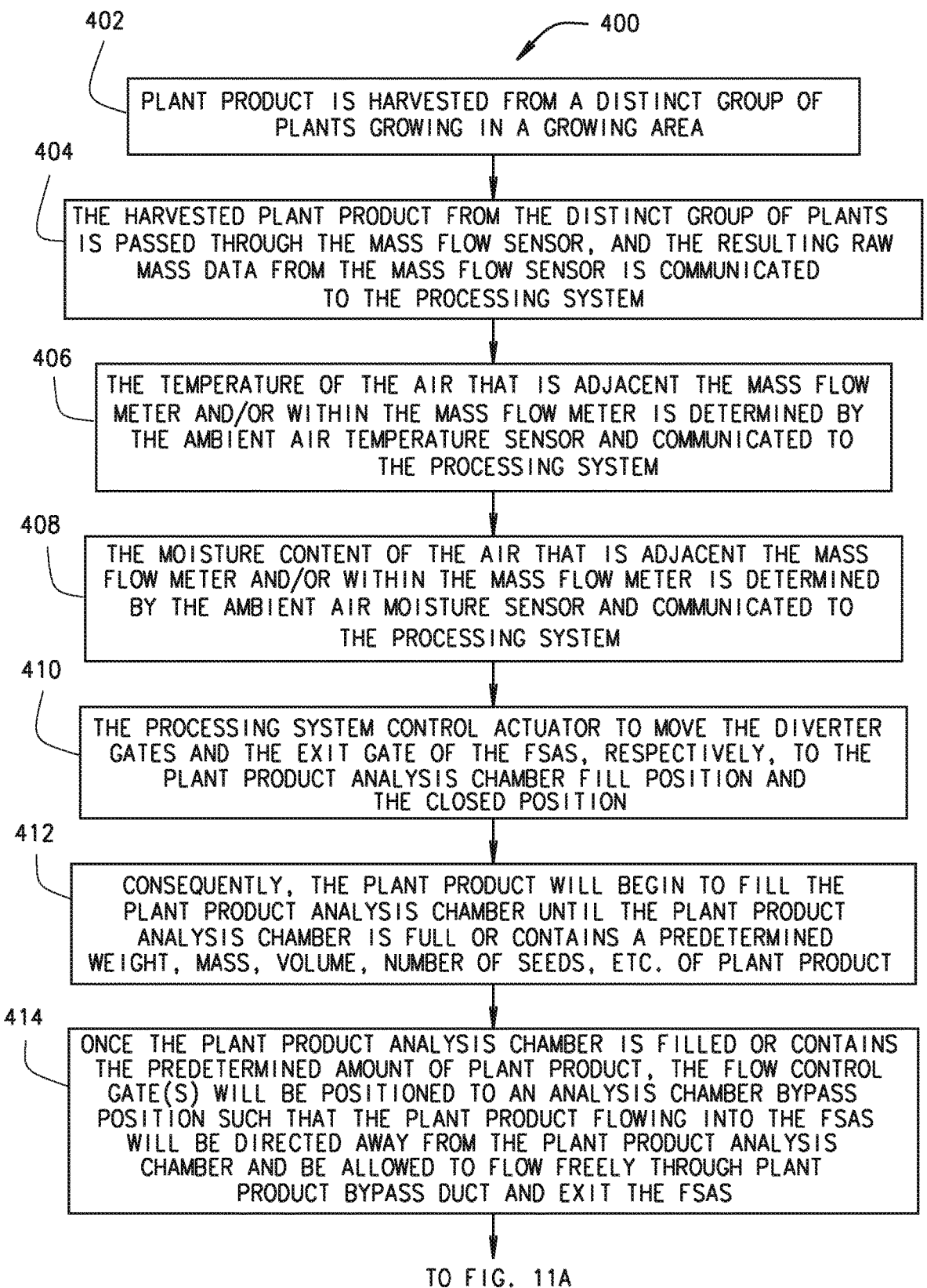

Referring now to FIG. 11, the flow chart 400 exemplarily illustrates operation of the system 10 to determine the yield of the plants from which plant product was harvested, and/or any other desired analytic information about the respective plants and/or plant product, in accordance with various embodiments of the present disclosure wherein the system 10 comprises the FSAS 38. Initially, plant product is harvested from a distinct group of plants growing in a growing area or field, as illustrated at 402. In various instances, the distinct group of plants can be plants growing in one or more test plot and be the subject of crop breeding and analytics research procedures and/or tests for developing various strains, hybrids, inbreds, genotypes, etc. of plants (e.g., each test plot can comprise different hybrids of plants, groups of plants that have been treated with different types of plant treatments, etc.). Thereafter, the harvested plant product from the distinct group of plants is passed through the mass flow meter 18, and the resulting raw mass data from the mass flow meter 18 is communicated to the processing system 30, as indicated at 404. In the embodiments wherein the system 10 is disposed in the mobile harvesting platform 14, the harvested plant product is manually or automatically fed into (or processed through) the system 10 as the plant product is being harvested and the mobile harvesting platform 14 moves through the field. In other embodiments, the harvested plant product can be collected in sample containers (e.g., the plant product from each test plot collected in a separate sample container) and taken to a location remote from the field and manually or automatically fed into (or processed through) the system 10.

In various embodiments, either prior to, or after, passing the harvested plant product through the mass flow meter 18, the temperature of the air that is adjacent the mass flow meter 18 (e.g., near an entrance or exit of the mass flow meter 18) and/or within the mass flow meter 18 is determined by the ambient air temperature sensor 22 and communicated to the processing system 30, as indicated at 406. Additionally, either prior to, or after, passing the harvested plant product through the mass flow meter 18, the moisture content of the air that is adjacent the mass flow meter 18 (e.g., near an entrance or exit of the mass flow meter 18) and/or within the mass flow meter 18 is determined by the ambient air moisture sensor 26 and communicated to the processing system 30, as indicated at 408.

Alternatively, in various other embodiments, in addition to passing the harvested plant product through the mass flow meter 18 to collect mass data, the temperature of the air that is adjacent the mass flow meter 18 (e.g., near an entrance or exit of the mass flow meter 18) and/or within the mass flow meter 18 can be determined by the ambient air temperature sensor 22 and communicated to the processing system 30. Additionally, the moisture content of the air that is adjacent the mass flow meter 18 (e.g., near an entrance or exit of the mass flow meter 18) and/or within the mass flow meter 18 can be determined by the ambient air moisture sensor 26 and communicated to the processing system 30.

In various embodiments, as the plant product from the distinct group of plants enters or is flowing though the mass flow meter, the processing system will control actuator(s) 58 and actuator(s) 70 to move the diverter gate(s) 54 and the exit gate(s) 66 of the FSAS 38, respectively, to a plant product analysis chamber fill position and the closed position, as shown in FIG. 9 and illustrated at 410. Consequently, after the plant product has passed through the mass flow meter 18, the plant product will begin to fill the plant product analysis chamber 46, and will continue to be directed into the plant product analysis chamber 46, via the diverter gate(s) 54, until the plant product analysis chamber 46 is full or until a predetermined amount (e.g., a predetermined weight, mass, volume, number of seeds, etc.) of plant product has been deposited into the plant product analysis chamber, as indicated at 412. In various instances, the diverter gate(s) do not have to be in the plant product fill position as soon as the FSAS 38 starts receiving plant product from the mass flow meter 18, but can be moved to the plant product fill position at any desired time before or after the FSAS 38 starts receiving plant product from the mass flow meter 18. In various embodiments, the FSAS 38 can comprise a plant product analysis chamber filled sensor (e.g., a chamber filled proximity sensor) 78 that is structured and operable to sense when the plant product analysis chamber 46 is filled with plant product, or contains a predetermined amount of plant product. Once the plant product analysis chamber 46 is filled or contains the predetermined amount of plant product, the flow control gate(s) 66 will be positioned, as controlled by the processing system 30, to an analysis chamber bypass position, as shown in FIGS. 7 and 10, such that the plant product flowing into the FSAS 38 will be directed away from the plant product analysis chamber 46 and be allowed to flow freely through plant product bypass duct 50 and exit the FSAS 38, as illustrated at 414.

Simultaneously with the plant product being directed through the bypass duct 50, the processing system 30 will controllably open the exit gate 66 a specific amount such that the plant product will flow out of the plant product analysis chamber 46 at a predetermined speed, rate, volume, etc., until the all the plant product in the plant product analysis chamber 46 has exited the plant product analysis chamber 46. Therefore, all the plant product disposed within the plant product analysis chamber 46 will flow through the plant product analysis chamber, across or adjacent or in front of the aspect sensor(s) 34 (e.g. the plant product moisture content sensor(s) 34), and exit the plant product analysis chamber 46 at the predetermined speed, rate, volume, etc., until the plant product aspect chamber 46 is empty, whereby the aspect sensor(s) 34 (e.g., the moisture content sensor(s) 34) can accurately acquire the respective aspect of the plant product (e.g., the moisture content of the plant product), as illustrated at 416. In various embodiments, the FSAS 38 can comprise a plant product analysis chamber empty sensor (e.g., a chamber empty proximity sensor) 80 that is structured and operable to sense when all plant product has exited the plant product analysis chamber 46, and the plant product analysis chamber 46 is empty and contains no plant product.

Thereafter, as the plant product flows out of the plant product analysis chamber 46 at the controlled predetermined speed, rate, volume, etc., the aspect sensor(s) 34 (e.g., the moisture content sensor(s) 34) determine an aspect, that is, gather data regarding a desired aspect of the harvested plant product, (e.g. gather moisture content data of the plant product) and communicate the aspect data (e.g., the plant product moisture content data) to the processing system 30, as indicated at 418. Particularly, by controlling the flow of the plant product from the plant product analysis chamber 46, and hence controlling the speed, rate, volume, etc. at which the plant product passes the aspect sensor(s) 34 (e.g., the moisture content sensors 34), the FSAS 38 allows the aspect sensor(s) 34 (e.g., the moisture content sensors 34) to very accurately gather the respective aspect data (e.g., very accurately gather the plant product moisture content data).

In various instances, it is envisioned that when the plant product analysis chamber 46 is filled or contains the predetermined amount of plant product, the plant product within the plant product analysis chamber 46 will be at least momentarily statically (e.g., not moving through the analysis chamber 46) positioned in front of or adjacent the aspect sensor(s) 34 (e.g., the moisture content sensor(s) 34). In such instances the aspect sensor(s) 34 (e.g., the moisture content sensor(s) 34) can begin to acquire (and in various instances complete the acquisition of) the respective aspect of the plant product (e.g., the moisture content of the plant product) while the plant product is static within the plant product analysis chamber 46.

Importantly, as the plant product is flowing from the plant product analysis chamber 46 and the aspect sensor(s) 34

(e.g., the moisture content sensors 34) are gathering and communicating the respective aspect data (e.g., plant product moisture content data), the system 10 can still be receiving and processing plant product harvested from the same a particular group of plants (e.g., from the same test plot), that is the system 10 can still be gathering plant product mass data, and/or air temperature data, and/or air moisture content data, as described above. Furthermore, as the system 10 continues to receive and process the mass data, and/or the air temperature data, and/or the air moisture content data from the plant product harvested from a particular group of plants (e.g., from the plants within same test plot), the diverter gate(s) 54 are directing such remaining harvested plant product through the bypass duct 50. Therefore, the plant product aspect data (e.g., the plant product moisture data) can be obtained at a high throughput rate such that the plant product aspect data (e.g., plant product moisture content data) can be determined substantially simultaneously with the plant product passing through the mass flow meter 18 and without interrupting the flow of the plant product through the mass flow meter 18. More particularly, in the embodiments wherein the system is disposed in the mobile harvesting platform 14, multiple groups of plant product sequentially harvested from multiple groups of plants (e.g., sequentially harvested from multiple test plots) can be processed through the mobile harvesting platform 14 and the system 10, and have the plant product aspect data (e.g., the plant product moisture content data) determined thereby at a high throughput rate without ceasing movement of the mobile harvesting platform 14 through the field, without ceasing the harvesting of the plant product, and without commingling of the plant product from the various different groups of plants (e.g., from different test plots).

Subsequently, the processing system 30 executes the plant product analytics software, utilizing the raw mass data, and/or the air temperature data, and/or the air moisture data, and/or the plant product aspect data (e.g. the plant product moisture content data) communicated to the processing system 30, to determine the yield of the distinct group of plants, as indicated at 420. Particularly, via execution of the plant product analytics software, the processing system 30 takes the raw mass data input thereto, and via execution of the plant product analytics software utilizes the air temperature, and/or the air moisture content data, and/or the plant product aspect data (e.g., the plant product moisture content data) to perform mathematical operations and computations on or assimilate with the raw mass data from the mass flow meter 18 to determine, or compute, plant yield data of the distinct group of plants (e.g., plant yield data for plants of particular test plot) that is significantly more accurate than plant yield data generated using known systems and methods.

It is envisioned that in various embodiments, the FSAS 38 can include one or more sensor (not shown) that can determine the rate (e.g., the speed and/or volume) at which the plant product is exiting plant product analysis chamber 46 when obtaining the aspect data (e.g., the plant product moisture content data), as described above. Furthermore, it is envisioned that the system 10 can be completely automated, using feedback mechanisms and cross-communication to control the actuators 58 and 70 and the flow of plant product to and from the plant product analysis chamber and to and from the bypass duct 50. For example, in various instances, the aspect sensor(s) 34 (e.g., the plant product moisture content sensor(s) 34) can be structured and operable to register (e.g., communicate to the processing system 30) when a reliable aspect (e.g., plant product moisture content) reading has been captured on a sample. Whereafter, the processing system 30 can trigger actuation of the exit gate(s) 66 to open wider (e.g. fully open) to evacuate all the remaining plant product from the plant product analysis chamber 46 and reset the system to receive the next sample.

As described above, system 10 is not limited to disposition within the mobile harvesting platform 14 (or any other field system), and can be implemented anywhere it is desirable to collect highly-accurate yield data from multiple plant product samples in a high-throughput fashion, for example, a fixed location such as a seed processing facility.

Furthermore, although the system 10 has been described herein as being used with regard to harvested plant product, it is envisioned that the system 10 can be implemented to analyze any small objects and remain within the scope of the present disclosure.

Figure 12:
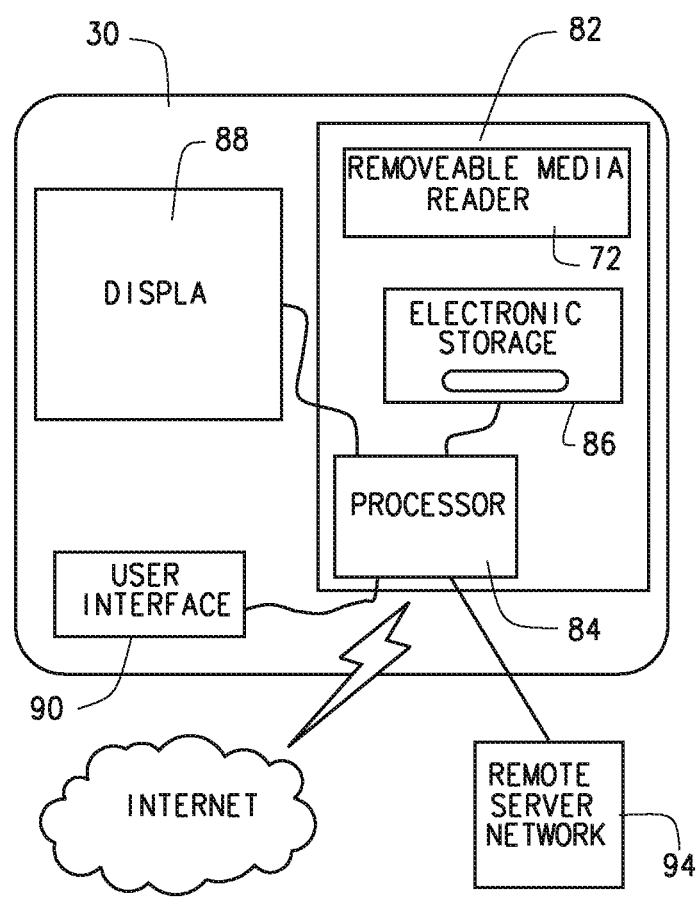
FIG. 12 is a block diagram of a computer based processing system of the plant performance data system shown in FIG. 1, in accordance with various embodiments of the present disclosure.

Referring now to FIG. 12, as described above, system 10 is controlled by the computer based process system 30, more particularly, by execution of one or more plant product analytics programs, algorithms, routines and/or other code (hereafter referred to simply as the plant product analytics software) executed by at least one processor of the processing system 30. In various embodiments, the processing system 30 can include one or more computer, controllers, programmable circuitry, electrical modules, etc. Particularly, in various embodiments, the processing system 30 is a computer based system that can include one or more computers and/or computer based modules 82 that each include at least one processor 84 suitable to execute the plant product analytics software. Each computer and/or computer based module 82 can additionally include at least one electronic storage device 86 that comprises a computer readable medium, e.g., non-transitory, tangible, computer readable medium, such as a hard drive, erasable programmable read-only memory (EPROM), electronically erasable programmable read-only memory (EEPROM), read-write memory (RWM), etc. Other, non-limiting examples of the non-transitory, tangible, computer readable medium are nonvolatile memory, magnetic storage, and optical storage. Generally, the computer readable memory can be any electronic data storage device for storing such things as the various software, programs, algorithms, code, digital information, data, look-up tables, spreadsheets and/or databases, etc., used and executed during operation of the system 10, as described herein.

Furthermore, in various implementations, the processing system 30 can include at least one display 88 for displaying such things as information, data and/or graphical representations, and at least one user interface device 90, such as a keyboard, mouse, stylus, and/or an interactive touch-screen on the display 88. In various embodiments, some or all of the computers and/or computer based modules 82 can include a removable media reader 92 for reading information and data from and/or writing information and data to removable electronic storage media such as floppy disks, compact disks, DVD disks, zip disks, flash drives or any other computer readable removable and portable electronic storage media. In various embodiments the removable media reader 92 can be an I/O port of the respective computer or computer based module 82 utilized to read external or peripheral memory devices such as flash drives or external hard drives.

In various embodiments, the processing system 30, e.g., one or more of the computers and/or computer based modules 82, can be communicatively connectable to a remote server network 94, e.g., a local area network (LAN), via a wired or wireless link. Accordingly, the processing system 30 can communicate with the remote server network 94 to upload and/or download data, information, algorithms, software programs, and/or receive operational commands. Additionally, in various embodiments, the processing system 30 can be structured and operable to access the Internet to upload and/or download data, information, algorithms, software programs, etc., to and from Internet sites and network servers. In various embodiments, the plant product analytics software executed by the processor(s) 84 to control the operations of the system 10 can be top-level system control software that not only controls the discrete hardware functionality of the system 10, but also prompts an operator for various inputs.

Referring to FIGS. 1 through 12, in the various embodiment wherein the system 10 is installed on a mobile platform 14, it is envisioned that in various implementations the system 10 can monitor the rate of plant product flowing through the mass flow meter 18, or more particularly monitor the lack of plant product flowing through the mass flow meter 18, to accurately determine the precise location of the beginning and the end of plots in a field. More particularly, by monitoring the flow of plant product through the mass flow meter 18, the system 10 can determine 'flow low points' of the flow of plant product through the mass flow meter 18, i.e., times with there is little or no plant product flowing through the mass flow meter 18, and subsequently identify such 'flow low points' as time when the mobile platform 14 and system 10 have exited a plot and entered and alley where no plant product is being harvested. For example, when the output of the mass flow meter 18 suddenly drops to zero (or near zero) the system 10 can interpret this means the mobile platform 14 and system 10 are in an alley between plots (or in a place where seeds were not planted). Subsequently, based on the renewed flow of plant product through the mass flow meter 18, the system 10 can determine that the mobile platform 14 and system 10 have exited an alley and entered and plot where plant product is once again being harvested. Moreover, alley identification information can be correlated with GPS information monitored by the system 10 to accurately identify the geospatially location of the alley(s).

Still further it is envisioned that the system 10 can utilize the alley identification and location information to estimate the yield of individual plants within each plot. For example, in various instances, the system 10 can monitor the rate of plant product flowing through the mass flow meter 18 as the mobile platform 14 and system 10 moves though a plot from one alley to the next, harvesting a row of plants. By identifying when the mobile platform 14 and system 10 enter and exit a plot, the system 10 can generate a flow rate graph, or flow rate pattern, illustrating the variance in flow rate of plant product through the mass flow meter 18 as the mobile platform 14 and system 10 traverse the plot harvesting plant product from the respective row of plants. The system 10 can then divide or partition the graph, or pattern, into a number of sections equal to the number of plants in the respective row, whereby each partitioned section of the graph or pattern correlates to the plant product harvested from each respective plant. For example, by accurately locating the alleys, the system 10 can precisely determine where the first plant in a plot row is located (this will correspond to the point when the flow meter output begins to climb as the plant product from that first plant start passing through mass flow meter 18). Thereafter, the output of the mass flow meter 18 will level off as the mobile platform 14 and system 10 move into the middle of the plot. Thereafter, when the last plant in a row is harvested and the last of its plant product trickle through the mass flow meter 18, the flow meter data will suddenly drop, indicating that mobile platform 14 and system 10 have moved out of the plot and into the next alley. By knowing the speed of mobile platform 14 and system 10 through the plot (e.g. a constant speed) the system 10 can estimate the yield of a particular plant by dividing up the flow graph or pattern of mass flow meter data by the number of plants in the plots. Accordingly, utilizing the mass flow data collected for each partitioned section of the graph or pattern and the corresponding GPS data, the system 10 can determine the yield for each respective plant and the geospatial location of each respective plant.

Experimental Test Results

Referring now to FIG. 13, in a first experimental test the inaccuracy of only using known protocols to determine plant product yield was shown. In the first experimental test, a mass flow meter was integrated into (e.g., disposed on) a combine harvester and used to collect mass flow meter data. This experiment included implementation of known protocols (e.g., algorithms provided by the original equipment manufacturers (OEM) to determine the plant product yield for plant product processed through the mass flow meter. Samples of plant product harvested from each of a plurality of test plots were processed through the mass flow meter as each test plot was harvested and the mass flow output from the mass flow meter, determined by the OEM algorithms, was recorded. Subsequently, each plant product sample was collected in separate containers and then brought to a location remote from the point of harvest at the side of the field to establish the control yield value for each sample, using a standard scale and a plant product analysis computer (GAC). Thereafter, the plant product yield values for each sample using the OEM protocol were contrasted to the GAC/scale-determined control values to reveal the difference (inaccuracy) that results using the OEM mass flow meter protocol.

More particularly, a MaxxFlow HTC mass flow meter (by SWR Engineering) was installed on a modern maize combine harvester to test the effectiveness of using a mass flow meter to measure plant product yield using the mass flow meter OEM's published protocols. The combine was used to harvest and shell the plant product from 522 corn test plots of varying genetics/pedigrees, each plot comprising 20-30 plants, in isolated batches (plant product from different plots was not allowed to comingle), to create 522 distinct "plot samples". After shelling, a plot sample was first accumulated in the combine's weigh bucket before being released to drop through the mass flow meter where the output signal for each plot sample was recorded.

After flowing through the mass flow meter, each plot sample was collected in separated containers and the mass of the plant product in each plot sample determined using a floor scale (i.e., a Adams Equipment CPWplus 150M). Subsamples of each plot sample were then analyzed by a GAC (i.e., a DICKEY-john GAC 2500-UGMA plant product analysis computer) to determine a test weight value for each sample. The mass and test weight values generated by the floor scale and/or GAC served as control, which were then contrasted with the results generated using the OEM's protocols to reveal the inaccuracy of using the OEM's protocols.

A linear regression model was then generated that contrasts the plant product yield values generated using only the mass flow meter OEM protocols (i.e., mass flow output adjusted by a proprietary "plant product" algorithm) versus the "true" plant product yield values determined by the floor scale and GAC. These results are shown in FIG. 13. Particularly, FIG. 13 shows the inaccuracy of the mass flow meter OEM algorithm for determining plant product yield. The x-axis represents the mass of each sample measured by passing each sample through a mass flow meter and generating the output via the mass flow meter OEM protocols. The y-axis represents the "true" weight of each sample, as determined by the GAC and the floor scale. As shown, the resulting data distribution shows a mean absolute error of 1.31 lbs and an $R^2$ value of 0.8781. It will be readily understood by one skilled in the art that $R^2$ is the statistical measure of how close the data are to the fitted regression line. These results indicated that using known methods of determining plant product yield with a mass flow meter were not sufficiently accurate for the desired purpose.

Referring now to FIG. 14, in a second experimental test it was shown how the plant performance data system 10 of the present disclosure, and the methods of using the system 10 as described above significantly increase the accuracy of plant product yield data obtained thereby, when compared to plant product yield data obtained using the known system and method described above in the first experimental test.

Particularly, the second experimental test demonstrates how obtaining raw mass flow meter data and incorporating therewith the temperature of the air that is adjacent and/or within the mass flow meter 18, the moisture content of the air that is adjacent and/or within the mass flow meter 18, and the moisture content of the plant product (obtained utilizing the system 10 as described above) improves the accuracy of plant product yield data obtained thereby, when compared to plant product yield data obtained using the known system and method described above in the first experimental test.

The following components of the system 10 of the present disclosure were installed on a mobile harvesting platform 14 (e.g., a modern maize combine harvester): a mass flow meter 18 (e.g., a MaxxFlow HTC SWR Engineering); a temperature sensor 22 and moisture sensor 26 (e.g., sensors by Omega Engineering) for sensing the temperature and moisture content of the adjacent the mass flow meter, and a sensor 34 for sensing the moisture content of each respective harvested plant product sample. The temperature and moisture sensor was installed inside the harvester near the mass flow meter. Data acquisition hardware and software were synthesized using National Instruments LabView for recording instrumentation responses and logging the values over time. The combine was used to harvest and shell the plant product from 522 corn test plots, each plot comprising 20-30 plants, in isolated batches to create 522 distinct "plot samples". After shelling, each plot sample was first accumulated in the combine's weigh bucket where the temperature and moisture of the air adjacent the mass flow meter 18 was recorded before the sample was dropped through the mass flow meter 18. The plot sample was then dropped through the mass flow meter and the raw data output signal for each plot sample was recorded.

After being passed through the mass flow meter 18, each plot sample was collected in a container and brought to a laboratory, remote from the point of harvest, whereafter the moisture content of each respective sample was determined, and the mass of each respective sample was determined using a floor scale (i.e., Adams Equipment CPWplus 150M). Subsamples of each plot sample were then analyzed by a GAC (i.e., a DICKEY-john GAC 2500-UGMA plant product analysis computer) to determine a test weight value and a sample moisture value for each sample. The results generated using the floor scale and/or GAC served as controls, which were then contrasted with the results generated when the mass flow meter data was combined with the air temperature, air moisture content, and sample moisture content data to reveal the accuracy of incorporating the additional variables into the calculation.

A linear regression model was then developed that contrasts the plant product yield values generated using embodiments of the system 10 of the present disclosure (i.e., the plant product yield values generated using the obtained raw mass flow data, the obtained air temperature data, the obtained air moisture content data, and obtained sample moisture content data) versus the "true" plant product yield values determined by the GAC and floor scale. These results are shown in FIG. 14. The x-axis represents the mass of each sample determined by combining the raw mass flow data output with the air temperature, the air humidity, and plant product sample moisture content. The y-axis represents the "true" weight of each sample, as measured manually with the floor scale. As shown, the resulting data distribution shows a mean absolute error of 0.83 lbs and an R2 value of 0.9421.

Hence, as illustrated by the experimental tests described above, the accuracy of the plant product yield data obtained using the system 10 of the present disclosure and the methods of using the system 10 described above (e.g., error=0.83 lbs, $R^2$=0.9421), is significantly improved over the accuracy of the plant product yield data obtained using known systems and methods (e.g., error=1.31 lbs, $R^2$=0.8781).

Referring now to FIG. 15, in a third experimental test it was shown how implementation of the FSAS 38, of the present disclosure, improves the accuracy of determining the moisture content of each plant product sample, as compared to the plant product moisture content values obtained using a GAC. In this experiment the 522 plot samples used in Example 2 were brought to a laboratory where the mass flow meter 18 (e.g., SWR MaxxFlow HTC) was attached to an FSAS 38 and suspended on a laboratory stand to simulate a gravity-fed system 10 that can be installed on a mobile harvesting platform 14 (e.g., a modern maize combine harvester), or alternatively can be installed in an analysis/processing facility. The plant product analysis chamber 46 of the FSAS 38 comprised two types of moisture sensors 34 positioned to sense moisture levels of plant product processed through the plant product analysis chamber 46 as described above, i.e., a microwave-based moisture sensor (e.g., a SWR M-Sens 2) and a capacitance-based moisture detector (e.g., a SWR M-Sens WR).

Testing comprised sequentially pouring each plot sample, in turn, through the system 10 and tracking the air temperature, the air moisture content, and the raw mass flow data output signal from the mass flow meter 18. Plant product exiting the mass flow meter 18 fell into the FSAS 38 and was directed to the analysis chamber 46 to determine sample moisture for each sample, as described above. A linear regression model was then developed that contrasts the plant product yield values generated using the system 10 including the FSAS 38 vs. the "true" yield values determined by the GAC and floor scale. These results are shown in FIG. 15.

FIG. 15 reveals the improvement in yield accuracy determination achieved by using an FSAS to generate sample moisture values instead of relying on the GAC to generate sample moisture values, as was done in experiment 2.

Hence, as illustrated by the experimental tests described above, the accuracy of the plant product yield data obtained using the system 10 and methods of the present disclosure in conjunction with the use of an FSAS 38 to generate sample moisture data (e.g. error=0.64 lbs, $R^2$=0.9645) is significantly improved over the accuracy of the plant product yield data obtained using either known systems and methods (e.g., error=1.31 lbs, $R^2$=0.8781) or methods of the present disclosure that used a GAC to determine sample moisture values (e.g., error=0.83 lbs, $R^2$=0.9421).

Furthermore, it is envisioned that, in various embodiments, the system 10 can also include any analytical tool or system useful for determining one or more traits related to crop performance, e.g. yield, fiber quality, etc. Such a system could be a totally automated 'Smart' system, such as the system described in PCT Application PCT/US2015/045301, titled Apparatus And Methods For In-Field Data Collection And Sampling, filed Aug. 14, 2015, and corresponding U.S. Provisional Application 62/037,968, filed Aug. 15, 2014, the disclosure of each being incorporated by reference herein in their entirety. Particularly, it is envisioned that the systems and method described in PCT Application PCT/US2015/045301 can incorporate the systems and methods described above, and vice-versa, to collect one or more plant product sample(s), analyze the sample(s), make a decision about a treatment application at the site or on a plant, and apply a treatment—all from the same platform. It is also envisioned that the sample(s) and any information regarding the sample(s), generated by the respective system, could be combined with any data or information collected from an "analytics suite", such as that described in PCT Application PCT/US2015/045301, (e.g., cameras, soil samples, etc., disposed on a mobile platform 14) to assist in this process. It is further envisioned that the system 10, or any part, component, assembly or subsystem thereof can be implemented as part of a larger crop analytics system, such as those described in U.S. patent application Ser. Nos. 14/206,238, 14/353,036, 15/502,548 and/or PCT applications PCT/US2016/046280.

The description herein is merely exemplary in nature and, thus, variations that do not depart from the gist of that which is described are intended to be within the scope of the teachings. Such variations are not to be regarded as a departure from the spirit and scope of the teachings.

The invention claimed is:

1. A plant product performance data collection system for determining performance data about groups of plants, said system comprising:
    a mass flow meter communicatively connected to a computer based data processing system, and structured and operable to generate mass data related to a mass of plant product passed through the mass flow meter, and communicate the mass data to the computer based data processing system;
    a temperature sensor communicatively connected to the computer based data processing system, and structured and operable to determine a temperature of the air that is one of adjacent the mass flow meter and within the mass flow meter, and communicate the temperature to the computer based data processing system; and
    a moisture sensor communicatively connected to the computer based data processing system, and structured and operable to determine a moisture of air that is one of adjacent the mass flow meter and within the mass flow meter, and communicate the moisture of the air to the computer based data processing system,
    wherein the computer based data processing system is structured and operable to utilize the mass data, the air temperature and the air moisture to determine a yield of the plants from which the plant product was harvested.

2. The system of claim 1 further comprising at least one plant product aspect sensor communicatively connected to the computer based data processing system, and structured and operable to determine at least one aspect of the plant product passed through the mass flow meter,
    wherein the computer based data processing system is structured and operable to utilize the mass data, the air temperature, the air moisture, and the at least one plant product aspect to determine a yield of the plants from which the plant product was harvested.

3. The system of claim 2, wherein the at least one aspect sensor comprises at least one moisture sensor structured and operable to determine the moisture of the plant product passed through the mass flow meter.

4. The system of claim 2 further comprising a plant product flow sampling and analysis system fluidly connected to the mass flow meter, the plant product flow sampling and analysis system comprising the at least one plant product aspect sensor.

5. The system of claim 4, wherein the plant product flow sampling and analysis system comprises:
    a tubular housing fluidly connected to the mass flow meter;
    an analysis chamber disposed internally within the housing and defining a bypass duct within the housing and external to the analysis chamber, the analysis chamber having the plant product aspect sensor disposed therein such that the plant product aspect sensor can determine the at least one aspect of the plant product passed through the mass flow meter; and
    a diverter system structured and operable, as controlled by the computer based data processing system, to direct the plant product into at least one of the analysis chamber and the bypass duct.

6. The system of claim 5, wherein the analysis chamber comprising an exit gate disposed at an egress end of the analysis chamber and structured and operable to control a flow of plant product exiting the analysis chamber.

7. The system of claim 6, wherein the analysis chamber further comprises at least one of:
    a chamber empty sensor structured and operable to sense when the analysis chamber is empty of plant product; and
    a chamber filled sensor structured and operable to sense when the analysis chamber contains a designated amount of plant product.

8. A method for determining performance data about groups of plants growing in a field, said method comprising:
    determining, via a temperature sensor of a plant performance data system, a temperature of air that is one of adjacent a mass flow meter and within the mass flow meter, the plant performance data system comprising the mass flow meter, and communicating the temperature of the air to a computer based data processing system of the plant performance data system;
    determining, via a moisture sensor of the plant performance data system, a moisture of the air that is one of adjacent the mass flow meter and within the mass flow meter, and communicating the moisture of the air to the computer based data processing system;
    passing plant product through the mass flow meter and generating mass data related to a mass of the plant product passed through the mass flow meter, and communicating the mass data to the computer based data processing system; and
    determining a yield of the plants from which the plant product was harvested based on the mass data generated by the mass flow meter, the determined air temperature and the determined air moisture.

9. The method of claim 8 further comprising:
determining at least one aspect of the plant product passed through the mass flow meter utilizing a plant product aspect sensor of the plant performance data system, and communicating data regarding the at least one plant product aspect to the computer based data processing system, and
determining a yield of the plants from which the plant product was harvested based on the mass data generated by the mass flow meter, the determined air temperature, the determined air moisture, and the data regarding the at least one plant product aspect to determine a yield of the plants from which the plant product was harvested.

10. The method of claim 9, wherein determining at least one aspect of the plant product passed through the mass flow meter comprises passing the plant product through a plant product flow sampling and analysis system fluidly connected to the mass flow meter, wherein the plant performance data system comprises the plant product flow sampling and analysis system and the plant product flow sampling and analysis system includes the at least one plant product aspect sensor.

11. The method of claim 10, wherein passing the plant product through a plant product flow sampling and analysis system to determine the at least one aspect of the plant product passed through the mass flow meter comprises directing the plant product into at least one of an analysis chamber and the bypass duct of the plant product flow sampling and analysis system via a diverter system of the plant product flow sampling and analysis system, the analysis chamber disposed internally within a tubular housing of the plant product flow sampling and analysis system and defining the bypass duct within the housing and external to the analysis chamber, the tubular housing fluidly connected to the mass flow meter, wherein the analysis chamber includes the plant product aspect sensor, whereby the plant product aspect sensor determines the at least one aspect of the plant product passed through the mass flow meter.

12. The method of claim 11, wherein passing the plant product through a plant product flow sampling and analysis system to determine the at least one aspect of the plant product passed through the mass flow meter further comprises;
controlling a flow of plant product exiting the analysis chamber via an exit gate disposed at an egress end of the analysis chamber;
sensing when the analysis chamber is empty of plant product via a chamber empty sensor; and
sensing when the analysis chamber contains a designated amount via a chamber filled sensor.

13. The method of claim 12, wherein determining at least one aspect of the plant product passed through the mass flow meter further comprises determining the moisture of the plant product passed through the mass flow meter via at least one plant product content moisture sensor disposed within the plant performance data system.

14. The method of claim 12, wherein the plant performance data system is disposed within a mobile mechanical device structured and operable to harvest plant product from plants as the mobile mechanical device moves through a field in which the plants are growing, and wherein determining the yield of the plants from which the plant product was harvested comprises:
passing plant product through the plant performance data system as the plant product is harvested by the plant product harvester as the plant product harvester moves through a field in which the plants from which the plant product is harvested are growing; and
determining the yield of the plants from which the plant product was harvested in real time.

15. The method of claim 8 further comprising determining the location of alleys that separate plots utilizing the mass data communicated to the computer based data processing system.

16. The method of claim 8 further comprising determining the yield of at least one plant growing within a plot utilizing the mass data communicated to the computer based data processing system.

17. A mobile mechanical device for harvesting plant product from plants as the mobile mechanical device moves through a field in which the plants are growing, said device comprising:
a plant product performance data system structured and operable to determine performance data about groups of the plants, the system comprising:
a mass flow meter communicatively connected to a computer based data processing system, and structured and operable to generate mass data related to a mass of plant product passed through the mass flow meter, and communicate the mass data to the computer based data processing system;
a temperature sensor communicatively connected to the computer based data processing system, and structured and operable to determine a temperature of the air that is one of adjacent the mass flow meter and within the mass flow meter, and communicate the temperature to the computer based data processing system; and
a moisture sensor communicatively connected to the computer based data processing system, and structured and operable to determine a moisture of air that is one of adjacent the mass flow meter and within the mass flow meter, and communicate the moisture of the air to the computer based data processing system,
wherein the computer based data processing system is structured and operable to utilize the mass data, the air temperature and the air moisture to determine a yield of the plants from which the plant product was harvested.

18. The device of claim 17, wherein the plant performance data system further comprising a plant product flow sampling and analysis system fluidly connected to the mass flow meter, the plant product flow sampling and analysis system comprising a plant product moisture sensor communicatively connected to the computer based data processing system, and structured and operable to determine a moisture content of the plant product passed through the mass flow meter,
wherein the computer based data processing system is structured and operable to utilize the mass data, the air temperature, the air moisture, and the plant product moisture content to determine a yield of the plants from which the plant product was harvested.

19. The device of claim 18, wherein the plant product flow sampling and analysis system comprises:
a tubular housing fluidly connected to the mass flow meter;
an analysis chamber disposed internally within the housing and defining a bypass duct within the housing and external to the analysis chamber, the analysis chamber having the plant product moisture sensor disposed therein such that the plant product moisture sensor can determine the moisture content of the plant product passed through the mass flow meter, the analysis chamber comprising an exit gate disposed at an egress end of the analysis chamber and structured and operable to control a flow of plant product exiting the analysis chamber; and a diverter system structured and operable, as controlled by the computer based data processing system, to direct the plant product into at least one of the analysis chamber and the bypass duct.

20. The device of claim 19, wherein the analysis chamber further comprises at least one of:

a chamber empty sensor structured and operable to sense when the analysis chamber is empty of plant product; and a chamber filled sensor structured and operable to sense when the analysis chamber contains a designated amount of plant product.

* * * * *